(12) United States Patent
Jiang et al.

(10) Patent No.: US 10,701,545 B2
(45) Date of Patent: Jun. 30, 2020

(54) FILE SENDING METHOD AND TERMINAL, AND FILE RECEIVING METHOD AND TERMINAL

(71) Applicant: Huawei Technologies Co., Ltd., Shenzhen (CN)

(72) Inventors: Zhongyin Jiang, Nanjing (CN); Dawei Li, Nanjing (CN); Kunfang Chen, Hangzhou (CN); Xingliang Tao, Shenzhen (CN); Jiasheng Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/332,180

(22) PCT Filed: Sep. 9, 2016

(86) PCT No.: PCT/CN2016/098580
§ 371 (c)(1),
(2) Date: Mar. 11, 2019

(87) PCT Pub. No.: WO2018/045561
PCT Pub. Date: Mar. 15, 2018

(65) Prior Publication Data
US 2019/0268749 A1     Aug. 29, 2019

(51) Int. Cl.
*H04W 4/80*     (2018.01)
*H04W 76/10*    (2018.01)
(Continued)

(52) U.S. Cl.
CPC .............. *H04W 8/005* (2013.01); *H04B 5/02* (2013.01); *H04L 67/06* (2013.01); *H04W 4/80* (2018.02);
(Continued)

(58) Field of Classification Search
CPC ....... H04W 4/80; H04W 76/14; H04W 76/15; H04W 76/00; H04W 76/10; H04W 48/10; H04B 5/02
See application file for complete search history.

(56) References Cited

U.S. PATENT DOCUMENTS

| 2012/0185520 A1 | 7/2012 | Iarocci et al. |
| 2013/0178163 A1 | 7/2013 | Wang |

(Continued)

FOREIGN PATENT DOCUMENTS

| CN | 103096506 A | 5/2013 |
| CN | 103199901 A | 7/2013 |

(Continued)

OTHER PUBLICATIONS

Machine Translation and Abstract of Chinese Publication No. CN104093148, Oct. 8, 2014, 4 pages.
(Continued)

*Primary Examiner* — Blane J Jackson
(74) *Attorney, Agent, or Firm* — Conley Rose, P.C.

(57) ABSTRACT

A file sending method, a file receiving method, and related terminals, where a first terminal is configured to scan on a BLUETOOTH low energy (BLE) broadcast channel to obtain a broadcast packet from at least one second terminal, determine at least one discoverable second terminal based on the broadcast packet, determine a target terminal that is configured to receive a file and that is in the at least one discoverable second terminal, send a coupling request to the target terminal, establish a BLE coupling between the first terminal and the target terminal, and send WI-FI direct coupling parameters to the target terminal using a BLE data channel of the BLE coupling. The WI-FI direct is established between the first terminal and the target terminal.

20 Claims, 14 Drawing Sheets

(51) Int. Cl.
*H04W 8/00* (2009.01)
*H04W 76/14* (2018.01)
*H04L 29/08* (2006.01)
*H04B 5/02* (2006.01)
*H04W 48/10* (2009.01)
*H04W 76/15* (2018.01)
*H04W 88/06* (2009.01)
*H04L 29/06* (2006.01)

(52) U.S. Cl.
CPC .............. *H04W 76/14* (2018.02); *H04L 69/18* (2013.01); *H04W 48/10* (2013.01); *H04W 76/15* (2018.02); *H04W 88/06* (2013.01)

(56) References Cited

U.S. PATENT DOCUMENTS

| | | | |
|---|---|---|---|
| 2013/0305186 A1 | 11/2013 | Kawano et al. | |
| 2014/0073244 A1* | 3/2014 | Ko | H04W 4/80 455/41.1 |
| 2015/0381830 A1 | 12/2015 | Wu et al. | |
| 2016/0150357 A1* | 5/2016 | Jung | H04W 52/0206 455/41.1 |
| 2016/0241726 A1 | 8/2016 | Okamura et al. | |
| 2016/0278006 A1 | 9/2016 | Lee et al. | |
| 2016/0316511 A1 | 10/2016 | Suzuki et al. | |
| 2017/0163846 A1 | 6/2017 | Ichikawa et al. | |
| 2017/0223579 A1* | 8/2017 | Lee | H04W 48/14 |
| 2018/0249313 A1 | 8/2018 | She et al. | |

FOREIGN PATENT DOCUMENTS

| | | |
|---|---|---|
| CN | 104093148 A | 10/2014 |
| CN | 104394600 A | 3/2015 |
| CN | 104580401 A | 4/2015 |
| CN | 104661230 A | 5/2015 |
| CN | 105188013 A | 12/2015 |
| CN | 105323223 A | 2/2016 |
| CN | 105407450 A | 3/2016 |
| EP | 3038397 A1 | 6/2016 |
| JP | 2012242846 A | 12/2012 |
| JP | 2013214803 A | 10/2013 |
| JP | 2015130637 A | 7/2015 |
| JP | 2016152538 A | 8/2016 |
| WO | 2011019976 A1 | 2/2011 |
| WO | 2013184110 A1 | 12/2013 |
| WO | 2015068988 A1 | 5/2015 |
| WO | 2016017908 A1 | 2/2016 |

OTHER PUBLICATIONS

Machine Translation and Abstract of Chinese Publication No. CN103096506, May 8, 2013, 13 pages.
Machine Translation and Abstract of Chinese Publication No. CN105188013, Dec. 23, 2015, 29 pages.
Machine Translation and Abstract of Chinese Publication No. CN105323223, Feb. 10, 2016, 34 pages.
Foreign Communication From a Counterpart Application, PCT Application No. PCT/CN2016/098580, English Translation of International Search Report dated Jun. 7, 2017, 2 pages.
Foreign Communication From a Counterpart Application, PCT Application No. PCT/CN2016/098580, English Translation of Written Opinion dated Jun. 7, 2017, 4 pages.
Foreign Communication From a Counterpart Application, European Application No. 16915495.2, Extended European Search Report dated Jul. 18, 2019, 9 pages.

* cited by examiner

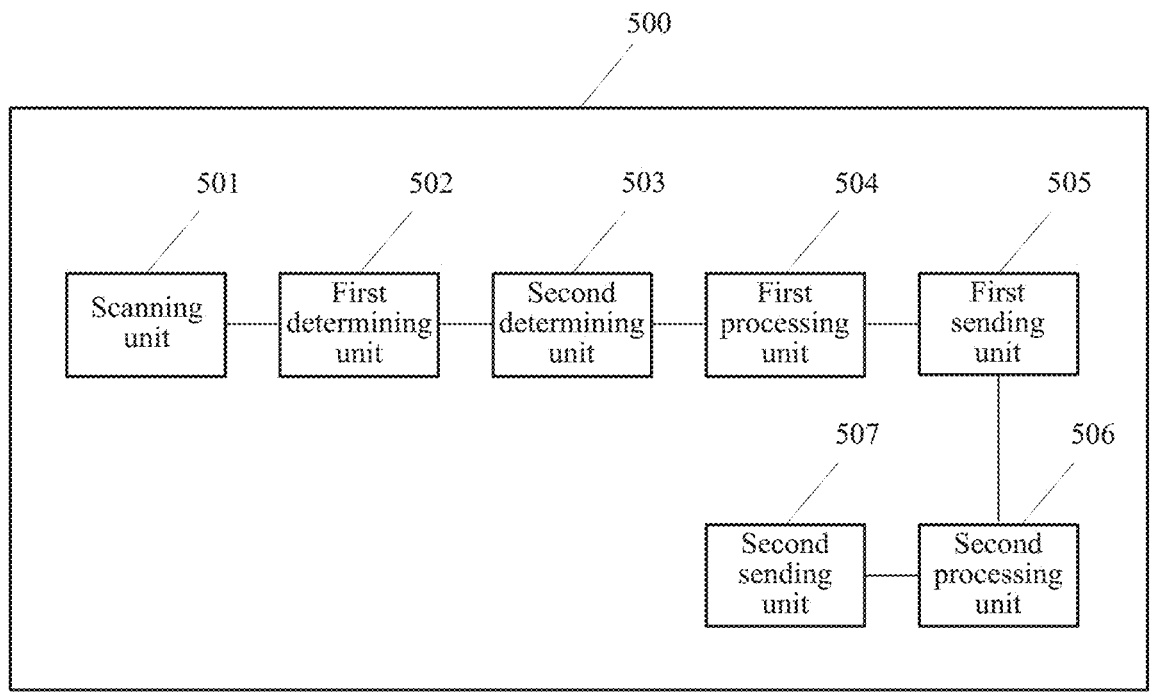
FIG. 5-a
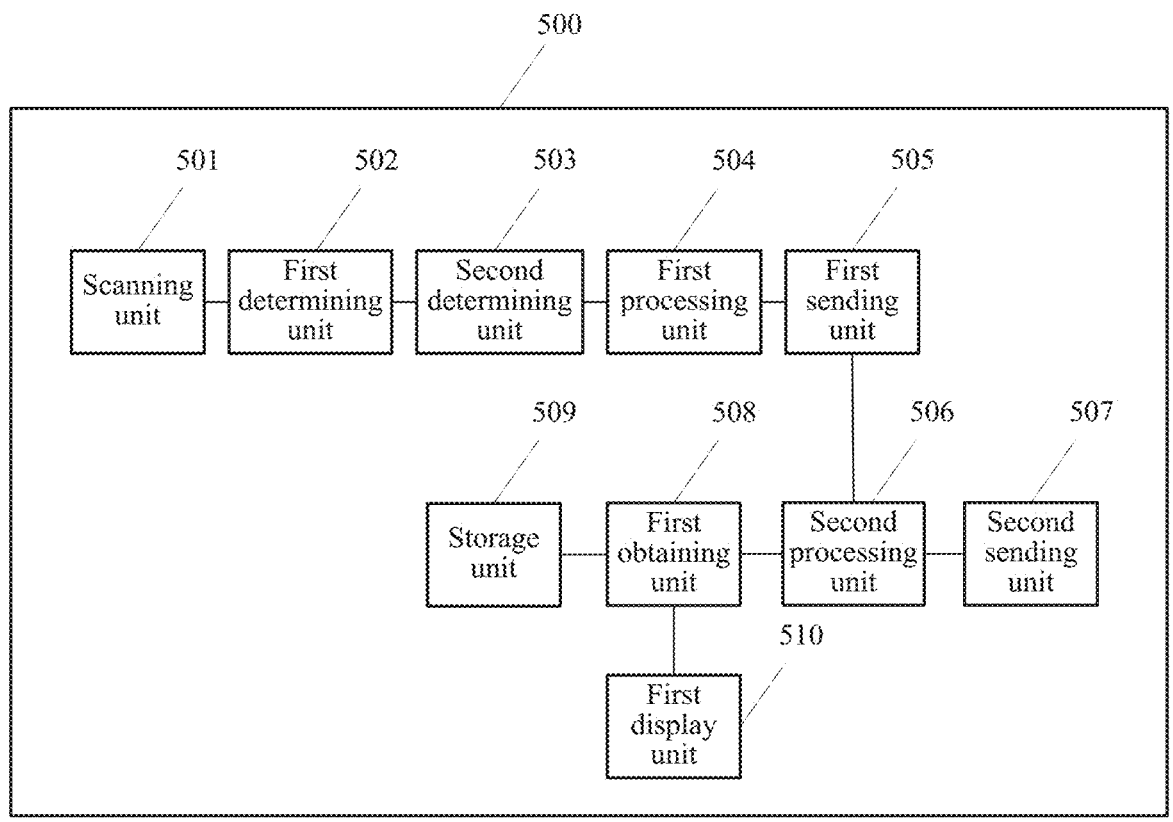
FIG. 5-b

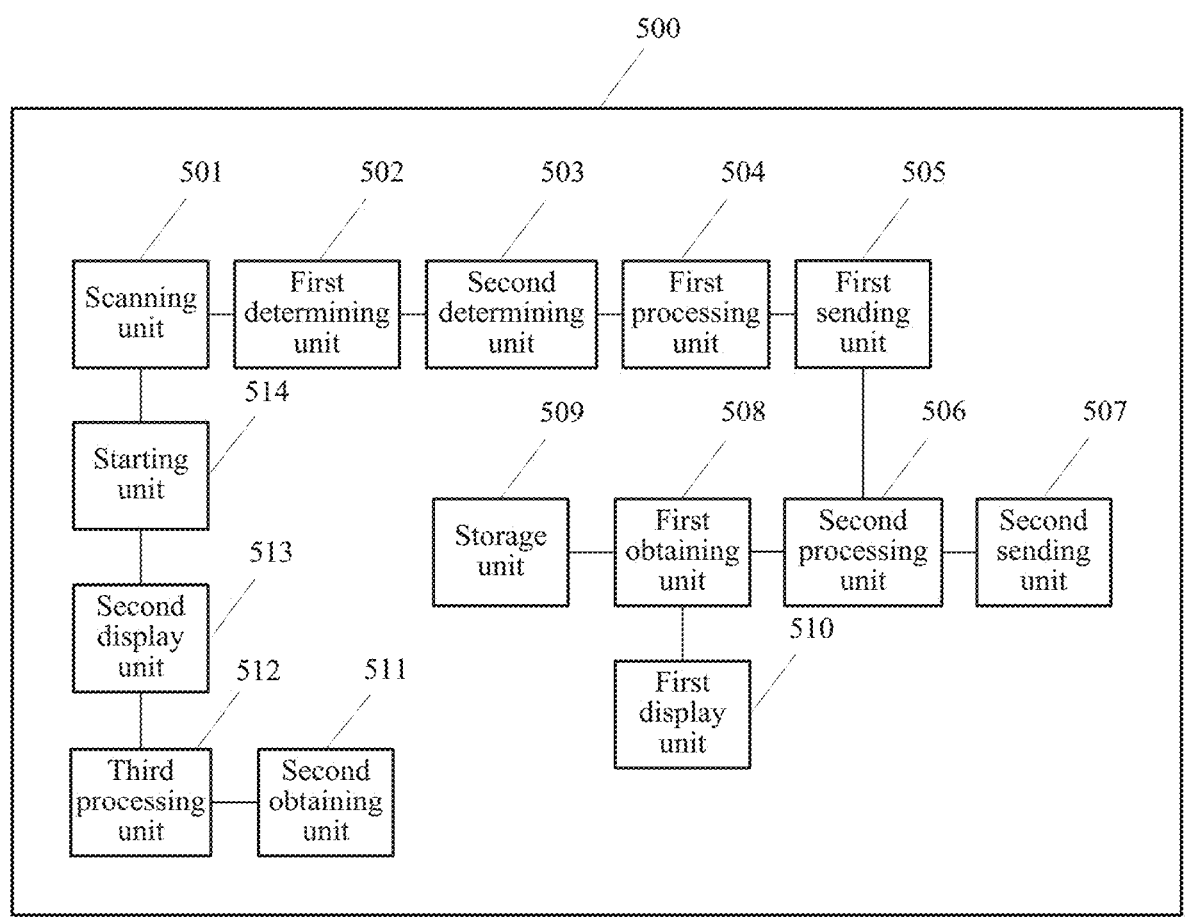
FIG. 5-c

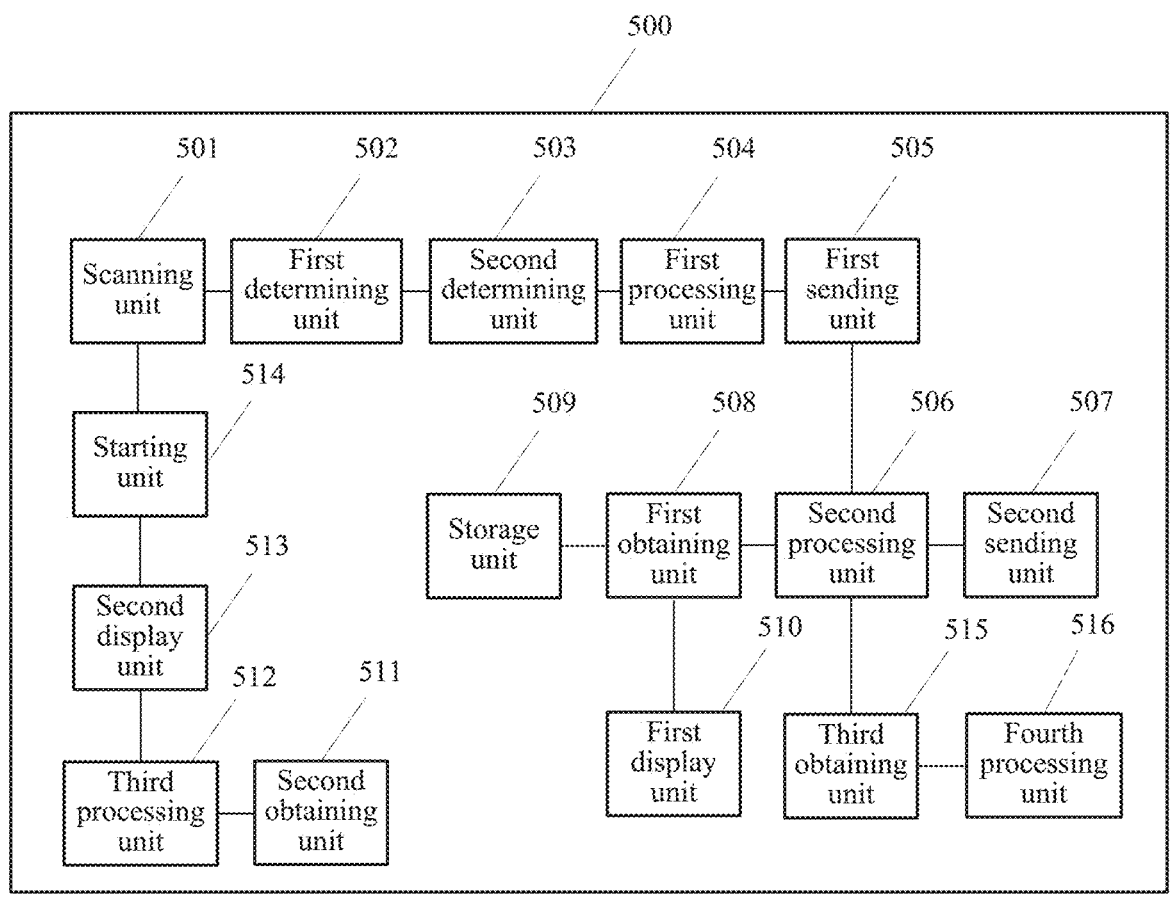
FIG. 5-d
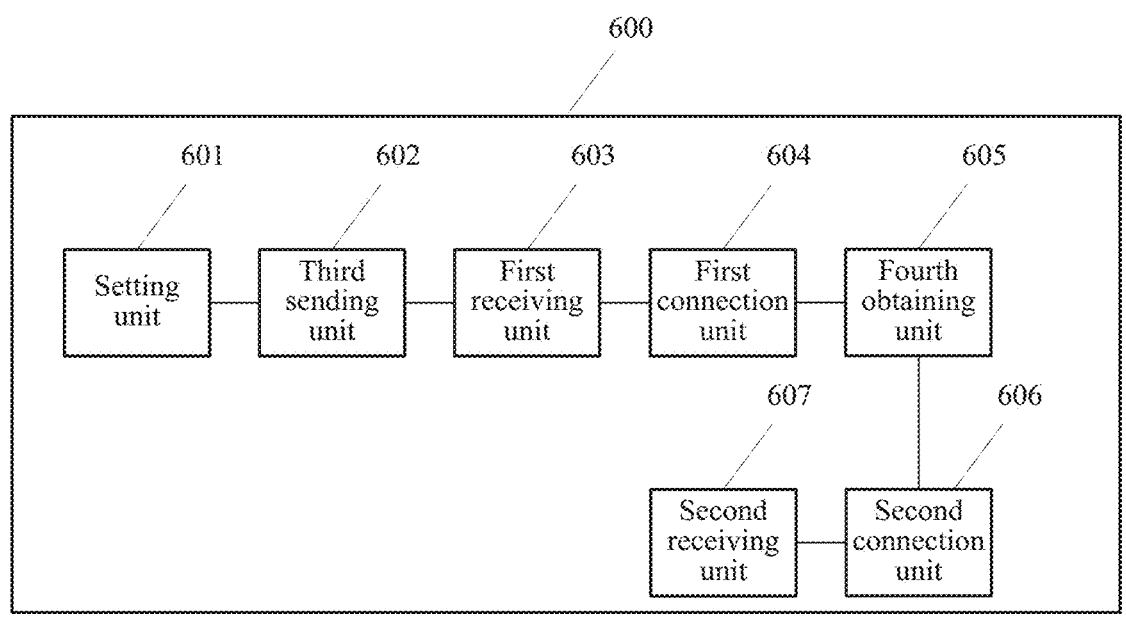
FIG. 6-a

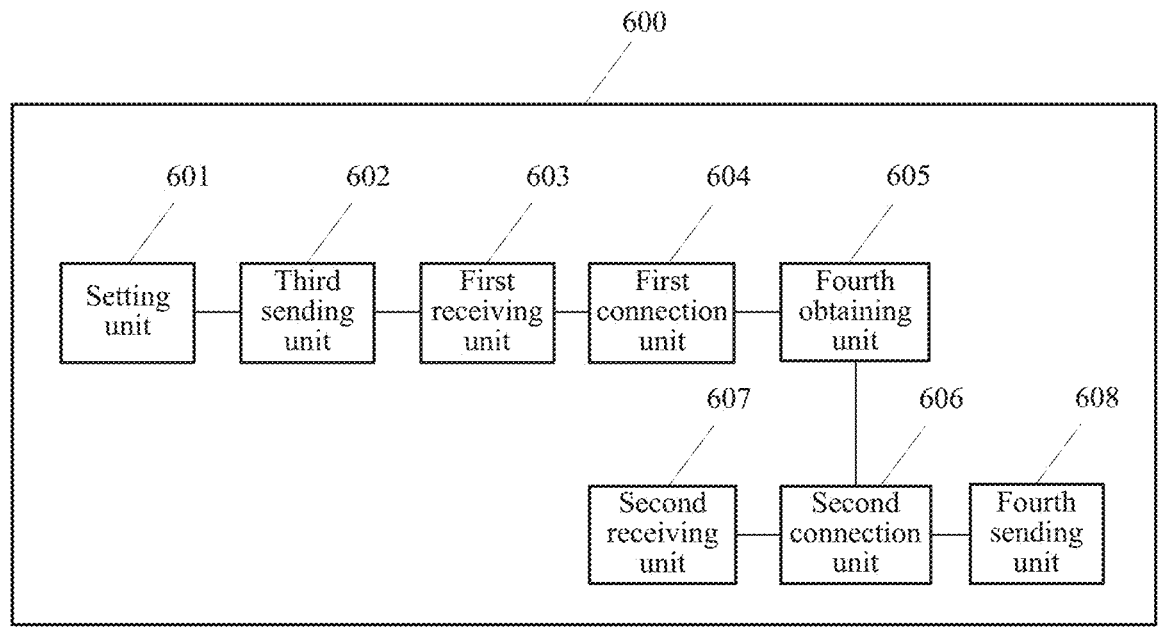
FIG. 6-b
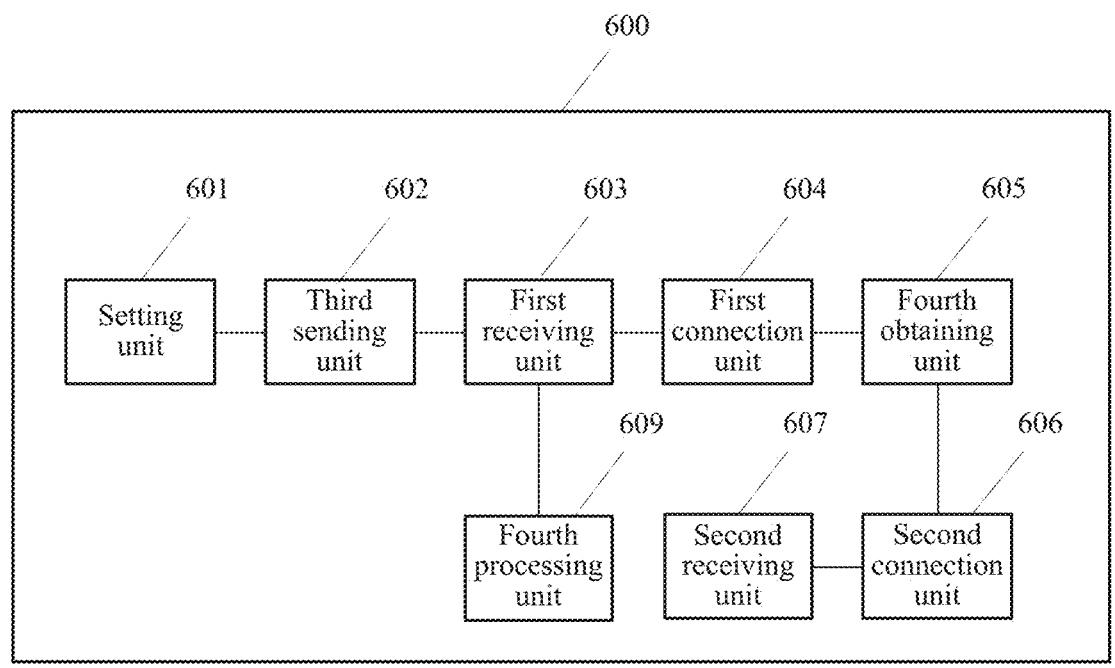
FIG. 6-c

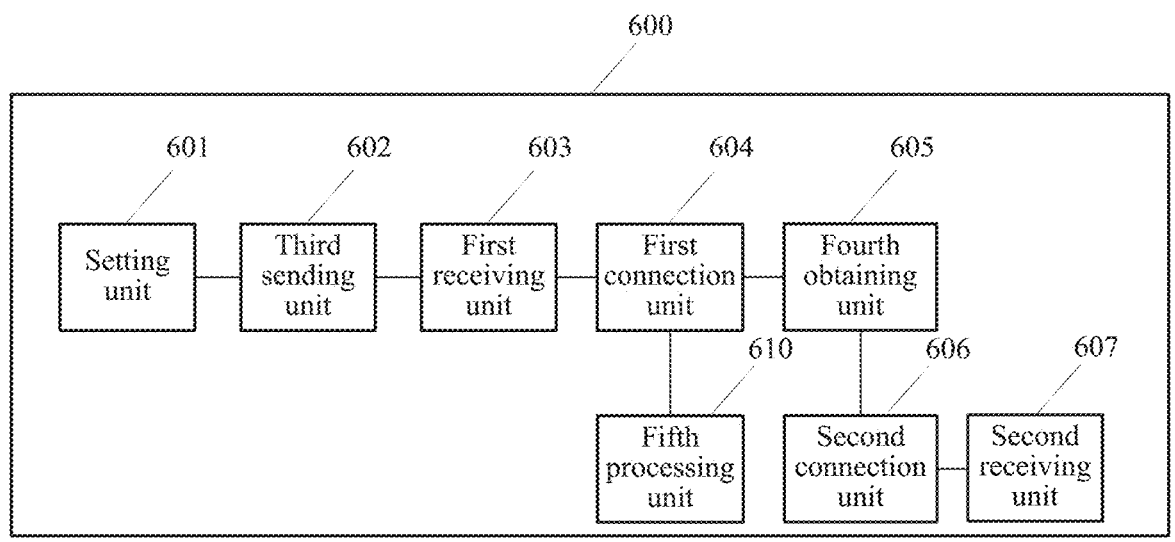
FIG. 6-d
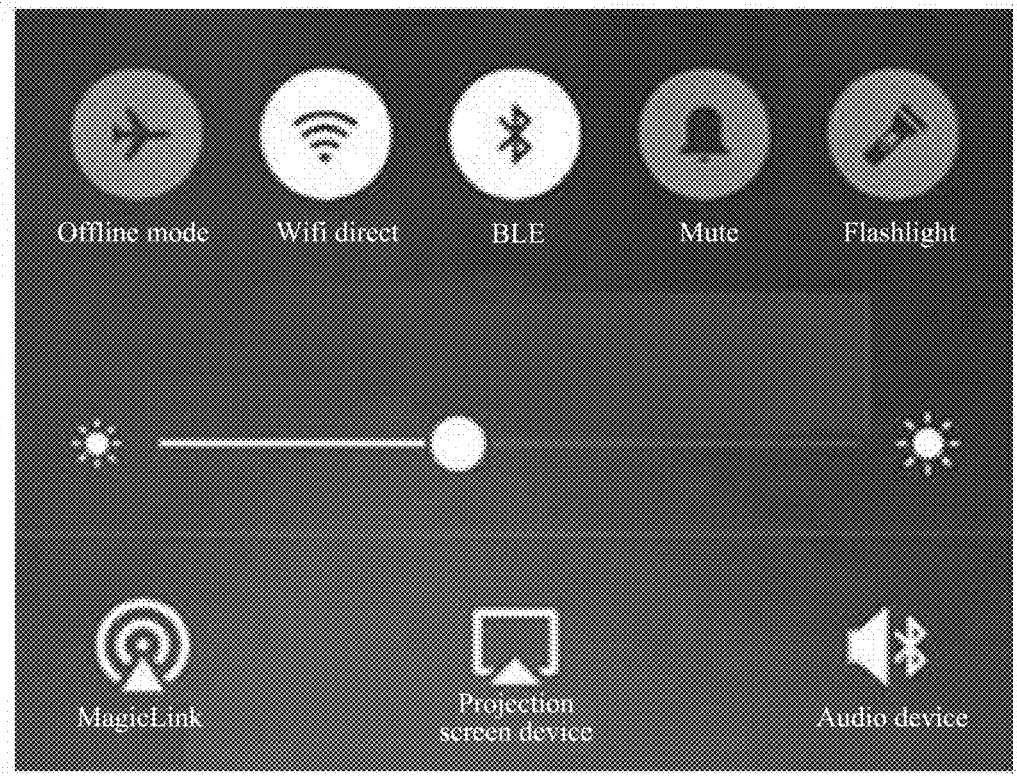
FIG. 7-a

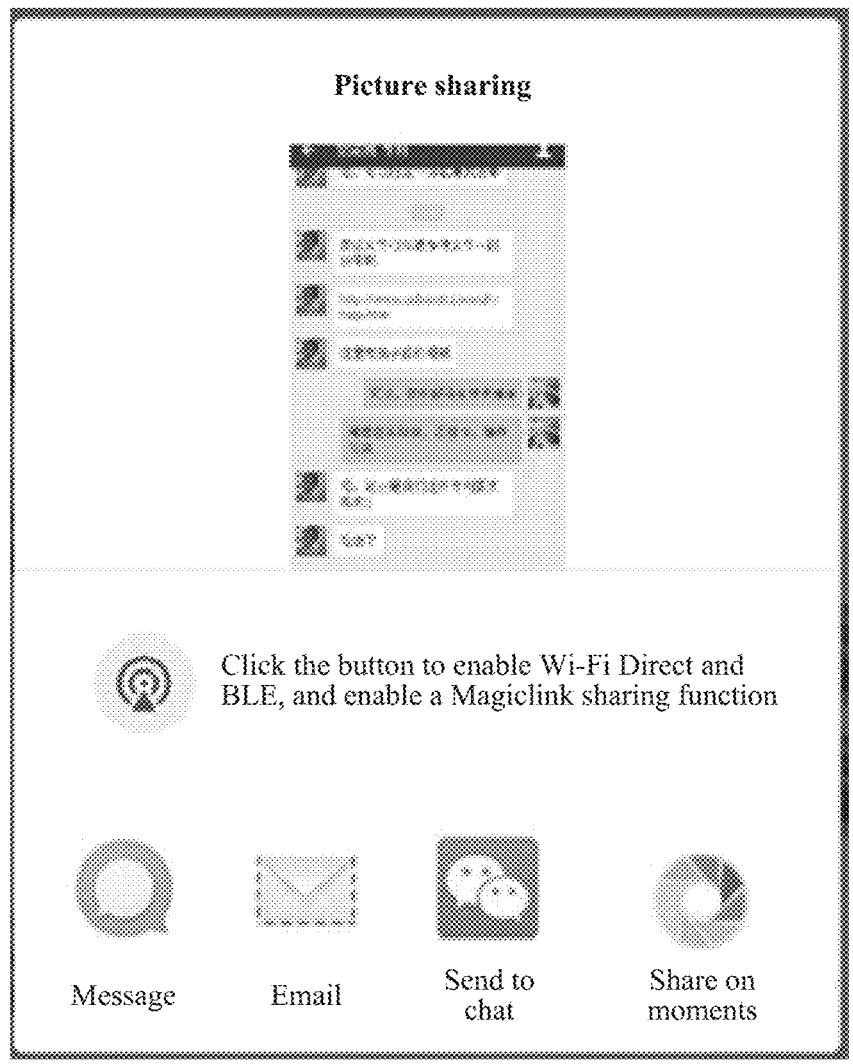
FIG. 7-b

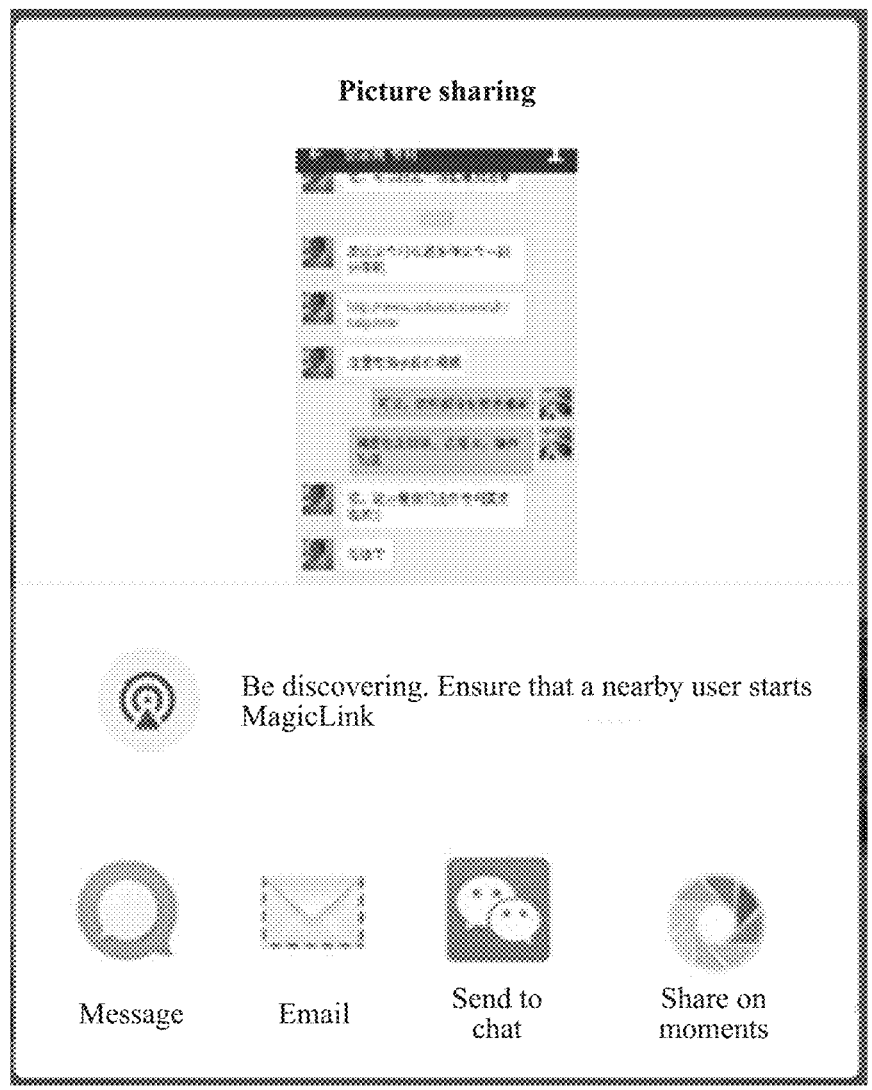
FIG. 7-c

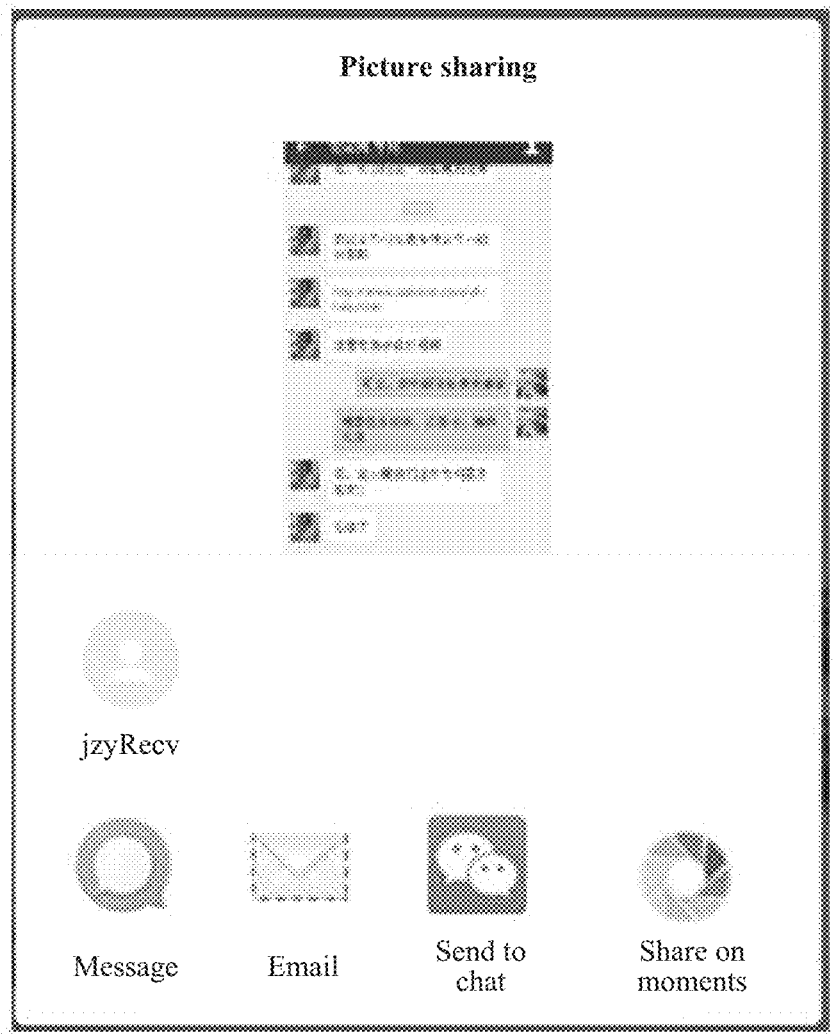
FIG. 7-d

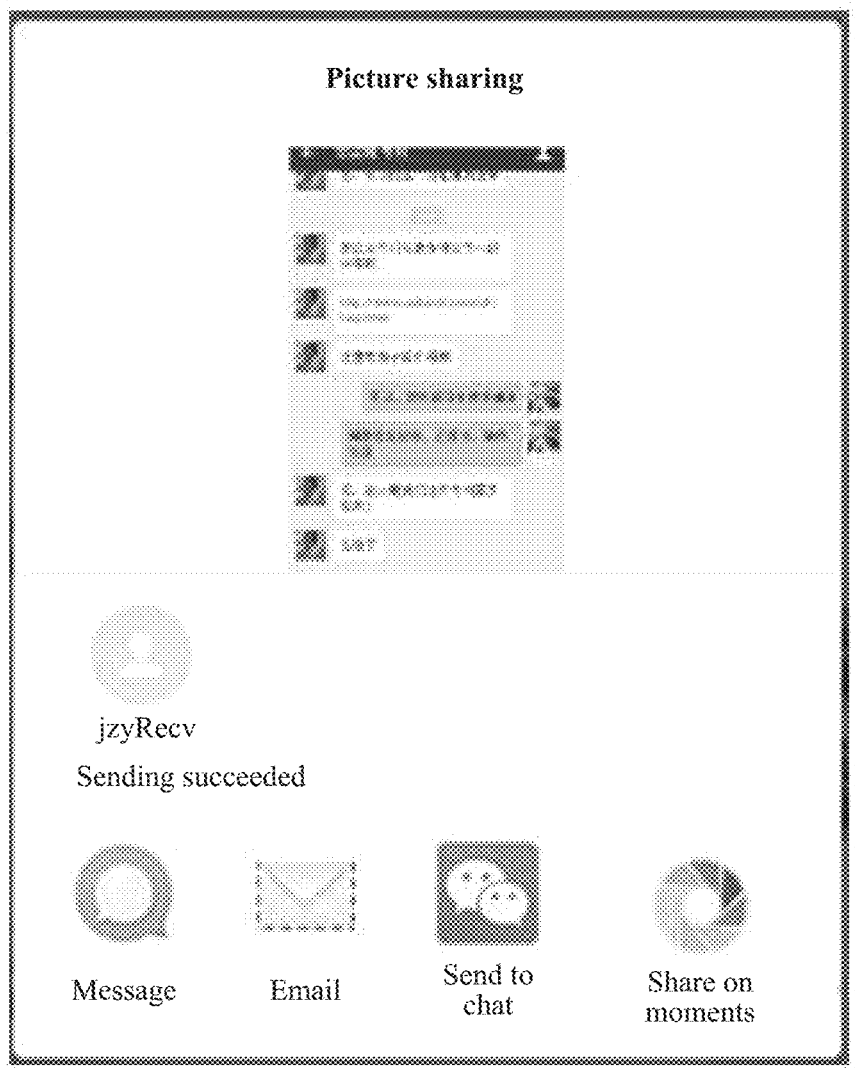
FIG. 7-e
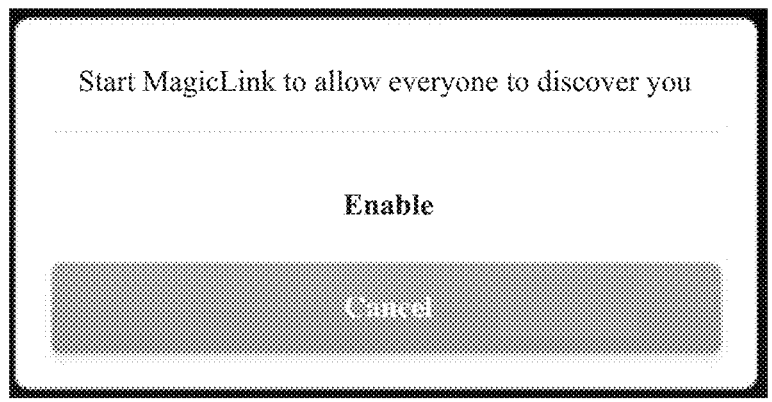
FIG. 7-f

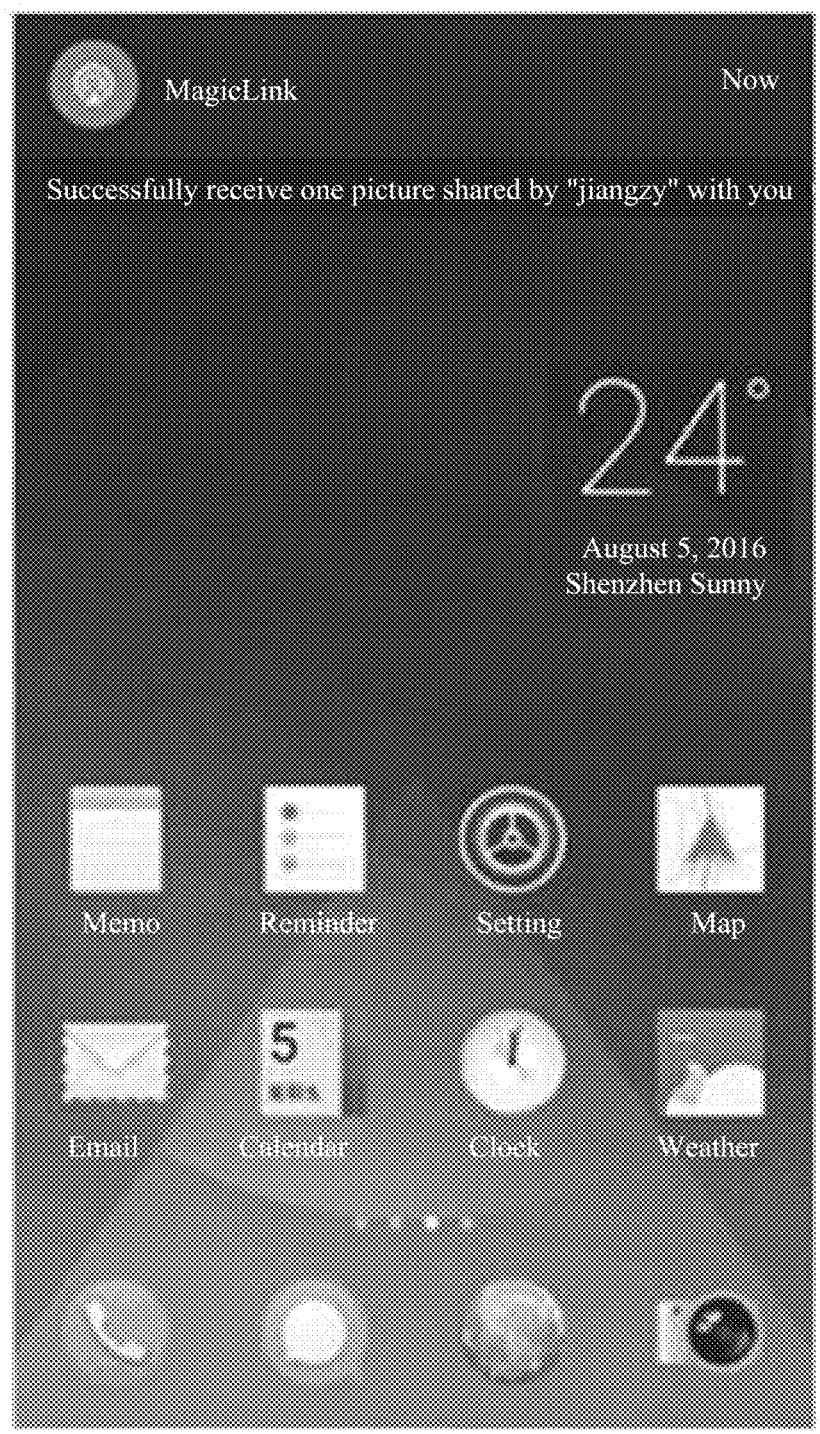
FIG. 7-g

FILE SENDING METHOD AND TERMINAL, AND FILE RECEIVING METHOD AND TERMINAL

CROSS-REFERENCE TO REPLATED APPLICATIONS

This application is a U.S. National Stage of International Patent Application No. PCT/CN2016/098580 filed on Sep. 9, 2016, which is hereby incorporated by reference in its entirely.

TECHNICAL HELD

The present invention relates to the field of mobile communications technologies, and in particular, to a file sending method and terminal, and a file receiving method and terminal.

BACKGROUND

With popularization of terminal devices, demands for sharing a file such as a picture file, a video file, or a music file between terminal devices are ever-increasing. Currently, when a transmit end shares a file with a receive end, the file is usually shared in a classic Bluetooth or high-fidelity direct (Wi-Fi direct) manner.

When a file is shared in the classic Bluetooth manner, a user triggers a discovering party and a discovered party to perform Bluetooth scanning, and the discovering party and the discovered party respectively perform frequency hopping on 79 channels by using different sequences, until the two parties perform frequency hopping synchronously. The discovering party successfully discovers the discovered party through scanning, and obtains device information of the discovered party, the user chooses to connect to a device, and a connecting party pre-estimates a sequence of a connected party, sends a connection request, and transmits the file after a connection is established. It should be noted that, before the discovering party and the discovered party establish a Bluetooth connection in the classic Bluetooth manner, the discovering party and the discovered party can successfully discover, through scanning, peers only when the discovering party and the discovered party perform frequency hopping on 79 channels until the two parties perform frequency hopping synchronously. That is, when a file is shared in the classic Bluetooth manner, a Bluetooth connection is established in a relatively long time, and efficiency is relatively low. Additionally, a transmission speed in the classic Bluetooth manner is relatively low and is only 2.1 Mbps.

When a file is shared in the Wi-Fi direct manner, a sending party and a receiving party enter a scanning state, and stay on 2.4 G channels and 5 G channels respectively for a period of time to perform detection, a quantity of the 2.4 G channels plus a quantity of the 5 G channels is more than 20, and a scanning period is relatively long.

Therefore, it can be learned that, when a file is shared, regardless of whether the classic Bluetooth manner or the Wi-Fi direct manner is used, a party can discover a peer only when the party performs scanning on a relatively large quantity of channels before a connection is established. Therefore, currently, when a file is shared, there are problems that a sending party and a receiving party can discover peers only in a relatively long time before the sending party and the receiving party are connected, efficiency is low, and the like.

SUMMARY

A technical problem to be resolved in embodiments of the present invention is to provide a file sending method, a file receiving method, and related terminals, so as to resolve a prior-art problem that a sending terminal discovers a receiving terminal in a long time and at low efficiency.

According to a first aspect, an embodiment of the present invention provides a file sending method, applied to a first terminal sending the file to a target terminal, where the first terminal enables a Bluetooth low energy (Bluetooth Low Energy, BLE) function and a Wireless Direct Wi-Fi direct function, and the method may include: performing, by the first terminal, scanning on a Bluetooth low energy (BLE) broadcast channel to obtain a broadcast packet sent by at least one second terminal, determining at least one discoverable second terminal based on the broadcast packet, and then determining a target terminal that is configured to receive the file and that is in the at least one discoverable second terminal; sending, by the first terminal, a connection request to the target terminal, and establishing a BLE connection between the first terminal and the target terminal; sending, by the first terminal, high-fidelity direct (Wi-Fi direct) connection parameters to the target terminal by using a BLE data channel of the BLE connection; receiving, by the first terminal, a Wi-Fi direct establishment request sent by the target terminal, and after the Wi-Fi direct establishment request is received, performing handshake with the target terminal to establish Wi-Fi direct, where the Wi-Fi direct establishment request is sent by the target terminal to the first terminal after the target terminal performs parameter configuration of the target terminal based on the connection parameters, the first terminal is a Wi-Fi direct group owner (GO), and the target terminal is a Wi-Fi direct group client (GC); and sending, by the first terminal, the file to the target terminal by using the Wi-Fi direct established between the first terminal and the target terminal.

In this embodiment of the present invention, BLE has only three broadcast channels, far less than broadcast channels of classic Bluetooth or Wi-Fi direct. Therefore, use of the technical solution provided in this embodiment of the present invention facilitates quick discovery of a discoverable second terminal. Additionally, because the first terminal scans the broadcast packet of the second terminal to discover the discoverable second terminal and determines the target terminal, a method for determining the target terminal is quite simple, and a process is quite short, so as to help quickly determine the target terminal. Additionally, after the first terminal sends the Wi-Fi direct connection parameters to the target terminal, the target terminal can directly initiate the Wi-Fi direct establishment request, and a Wi-Fi direct establishment time can also be shortened. The file is transmitted in a Wi-Fi direct manner, and a file transmission speed and efficiency are ensured. Therefore, the technical solution provided in this embodiment of the present invention facilitates improvement in file sharing efficiency.

In a possible implementation, after the establishing, by the first terminal, Wi-Fi direct between the first terminal and the target terminal by using the Wi-Fi direct connection parameters, the method further includes: obtaining, by the first terminal, information used to indicate whether a Wi-Fi direct interface of the target terminal is occupied; and if the information indicates that the Wi-Fi direct interface of the target terminal is occupied, popping up, on a display screen of the first terminal, a reminder message indicating that the file cannot be successfully sent temporarily, or if the information indicates that the Wi-Fi direct interface of the target terminal is not occupied, sending, by the first terminal, the Wi-Fi direct connection parameters to the target terminal by using the BLE data channel of the BLE connection.

In the solution provided in this embodiment of the present invention, after the BLE connection is established between the first terminal and the target terminal, the information indicating whether the Wi-Fi direct interface is occupied is obtained, and when the Wi-Fi direct interface is occupied, the reminder message indicating that the file cannot be successfully sent temporarily is popped up, and the Wi-Fi direct connection parameters are stopped from being sent to the target terminal, so that Wi-Fi direct occupancy information can be understood as soon as possible, so as to reduce BLE transmission resources, simplify the process, and provide better user experience.

In a possible implementation, after the establishing, by the first terminal, Wi-Fi direct between the first terminal and the target terminal, the method further includes: obtaining, by the first terminal, an account avatar of the target terminal; and storing, by the first terminal, the obtained account avatar of the target terminal, and a correspondence between the target terminal and the account avatar in the first terminal.

In a possible implementation, before the determining, by the first terminal, a target terminal that is configured to receive the file and that is in the at least one discoverable second terminal, the method further includes: displaying, by the first terminal, an account avatar of the at least one discoverable second terminal, where the account avatar of the at least one discoverable second terminal is stored in the first terminal.

In a possible implementation, the determining, by the first terminal, at least one discoverable second terminal based on the broadcast packet includes: parsing, by the first terminal, the broadcast packet; and if a parsing result of the broadcast packet does not include information indicating that authentication needs to be performed on a terminal receiving the broadcast packet, determining, by the first terminal, a second terminal sending the broadcast packet as a discoverable second terminal.

In a possible implementation, the determining, by the first terminal, at least one discoverable second terminal based on the broadcast packet includes: parsing, by the first terminal, the broadcast packet; and if a parsing result of the broadcast packet includes information indicating that authentication needs to be performed on a terminal receiving the broadcast packet, sending, by the first terminal, an authentication request to a second terminal sending the broadcast packet, and obtaining an authentication result of performing authentication on the authentication request by the second terminal; and if the authentication result indicates that the authentication succeeds, determining the second terminal sending the broadcast packet as a discoverable second terminal.

In the solution provided in this embodiment of the present invention, authentication is performed on a first terminal that can discover a second terminal, and only the first terminal on which authentication is performed successfully can discover the second terminal. This embodiment helps improve communication security and prevent the second terminal from being discovered by an unauthorized user on which authentication is performed unsuccessfully, so as to facilitate reduction in harassment on the second terminal by the unauthorized user.

In a possible implementation, before the performing, by the first terminal, scanning on a BLE broadcast channel to obtain a broadcast packet sent by at least one second terminal, the method further includes: obtaining, by the first terminal, a touch track on the display screen of the first terminal; when the touch track is a touch track sliding from the bottom of the display screen of the first terminal to the middle, performing, by the first terminal, triggering to generate a first instruction; displaying, by the first terminal, a shared application program preview screen including a designated application program, on the display screen of the first terminal based on the first instruction; and obtaining a touch instruction for the designated application program, and starting the designated application program.

In the solution provided in this embodiment of the present invention, triggering is performed in a manner of sliding from the bottom of the display screen of the first terminal to the middle to generate the first instruction, and operations are concise and convenient.

According to a second aspect, an embodiment of the present invention provides a file receiving method, applied to a second terminal receiving the file sent by a first terminal, where the second terminal enables a Bluetooth low energy BLE function and a Wireless Direct Wi-Fi direct function, and the method may include: setting, by a target terminal, Bluetooth low energy (BLE) to be in a discoverable mode; sending, by the target terminal, a broadcast packet on a BLE broadcast channel; receiving, by the target terminal, a connection request that is used to establish a BLE connection and that is sent by the first terminal, and establishing a BLE connection between the target terminal and the first terminal; obtaining, by the target terminal by using a BLE data channel of the BLE connection, high-fidelity direct (Wi-Fi direct) connection parameters sent by the first terminal; after the target terminal performs parameter configuration of the target terminal based on the connection parameters, sending, by the target terminal, a Wi-Fi direct establishment request to the first terminal, and performing handshake with the first terminal to establish Wi-Fi direct, where the handshake is initiated after the first terminal receives the Wi-Fi direct establishment request, the first terminal is a Wi-Fi direct group owner (GO), and the target terminal is a Wi-Fi direct group client (GC); and receiving, by the target terminal by using the Wi-Fi direct, the file sent by the first terminal.

In this embodiment of the present invention, after the first terminal sends the Wi-Fi direct connection parameters to the target terminal, the target terminal can directly initiate the Wi-Fi direct establishment request, and a Wi-Fi direct establishment time can be shortened. The file is transmitted in a Wi-Fi direct manner, and a file transmission speed and efficiency are ensured. Therefore, the technical solution provided in this embodiment of the present invention facilitates improvement in file sharing efficiency.

In a possible implementation, after the establishing, by the target terminal, a BLE connection between the target terminal and the first terminal, the method further includes: determining, by the target terminal, whether a Wi-Fi direct interface of the target terminal is occupied; and sending, by the target terminal to the first terminal, information used to indicate whether the Wi-Fi direct interface of the target terminal is occupied.

In the solution provided in this embodiment of the present invention, after the BLE connection is established between the target terminal and the first terminal, the information indicating whether the Wi-Fi direct interface is occupied is determined, and when the Wi-Fi direct interface is occupied, the first terminal is notified, so that the first terminal may understand Wi-Fi direct occupancy information as soon as possible, so as to reduce BLE transmission resources, simplify the process, and provide better user experience.

In a possible implementation, after the establishing, by the target terminal, Wi-Fi direct between the target terminal and the first terminal, the method further includes: sending, by the target terminal, an account avatar of the target terminal to the first terminal.

In a possible implementation, if the broadcast packet includes information used to indicate that authentication needs to be performed on a terminal receiving the broadcast packet, before the receiving, by the target terminal, a connection request that is used to establish a BLE connection and that is sent by the first terminal sending the file, the method further includes: receiving, by the target terminal, an authentication request sent by the first terminal; and performing, by the target terminal, authentication on the authentication request, and sending an authentication result to the first terminal.

In the technical solution provided in this embodiment of the present invention, information indicating whether authentication needs to be performed on a terminal obtaining the broadcast packet, and an authentication method when authentication needs to be performed are set in the broadcast packet, so as to help improve communication security and prevent the target terminal from being discovered by an unauthorized user on which authentication is performed unsuccessfully, thereby facilitating reduction in harassment on the target terminal by the unauthorized user.

According to a third aspect, an embodiment of the present invention provides a file sending terminal, configured to send the file to a target terminal, where the sending terminal enables a Bluetooth low energy (BLE) function and a high-fidelity direct (Wi-Fi direct) function, and the sending terminal may include: a scanning unit, configured to perform scanning on a BLE broadcast channel to obtain a broadcast packet sent by at least one second terminal; a first determining unit, configured to determine at least one discoverable second terminal based on the broadcast packet; a second determining unit, configured to determine a target terminal that is configured to receive the file and that is in the at least one discoverable second terminal; a first processing unit, configured to send a connection request to the target terminal, and establish a BLE connection between the sending terminal and the target terminal; a first sending unit, configured to send Wi-Fi direct connection parameters to the target terminal by using a BLE data channel of the BLE connection; a second processing unit, configured to receive a Wi-Fi direct establishment request sent by the target terminal, and after the Wi-Fi direct establishment request is received, perform handshake with the target terminal to establish Wi-Fi direct, where the Wi-Fi direct establishment request is sent by the target terminal to the first terminal after the target terminal performs parameter configuration of the target terminal based on the connection parameters, the sending terminal is a Wi-Fi direct group owner (GO), and the target terminal is a Wi-Fi direct group client (GC); and a second sending unit, configured to send the file to the target terminal by using the Wi-Fi direct.

In a possible implementation, the sending terminal further includes: a third obtaining unit, configured to: after the BLE connection is established, obtain information used to indicate whether a Wi-Fi direct interface of the target terminal is occupied; and a fourth processing unit, configured to: if the information indicates that the Wi-Fi direct interface of the target terminal is occupied, pop up, on a display screen of the sending terminal, a reminder message indicating that the file cannot be successfully sent temporarily, or if the information indicates that the Wi-Fi direct interface of the target terminal is not occupied, send, by the sending terminal, the Wi-Fi direct connection parameters to the target terminal by using the BLE data channel of the BLE connection.

In a possible implementation, the sending terminal further includes: a first obtaining unit, configured to: after the Wi-Fi direct is established, obtain an account avatar of the target terminal; and a storage unit, configured to store the account avatar, and a correspondence between the target terminal and the account avatar in the sending terminal.

In a possible implementation, the sending terminal further includes: a first display unit, configured to: before the target terminal configured to receive the file is determined, display an account avatar of the at least one discoverable second terminal, where the account avatar of the at least one discoverable second terminal is stored in the sending terminal.

In a possible implementation, the first determining unit is specifically configured to: parse the broadcast packet; and if a parsing result of the broadcast packet does not include information indicating that authentication needs to be performed on a terminal receiving the broadcast packet, determine, by the sending terminal, a second terminal sending the broadcast packet as a discoverable second terminal.

In a possible implementation, the first determining unit is specifically configured to: parse the broadcast packet; if a parsing result of the broadcast packet includes information indicating that authentication needs to be performed on a terminal receiving the broadcast packet, send an authentication request to a second terminal sending the broadcast packet, and obtain an authentication result of performing authentication on the authentication request by the second terminal; and if the authentication result indicates that the authentication succeeds, determine the second terminal sending the broadcast packet as a discoverable second terminal.

According to a fourth aspect, an embodiment of the present invention provides a file receiving terminal, configured to receive the file sent by a first terminal, where the receiving terminal enables a Bluetooth low energy (BLE) function and a high-fidelity direct (Wi-Fi direct) function, and the receiving terminal may include: a setting unit, configured to set BLE to be in a discoverable mode; a third sending unit, configured to send a broadcast packet on a BLE broadcast channel; a first receiving unit, configured to receive a connection request that is used to establish a BLE connection and that is sent by the first terminal; a first connection unit, configured to: in response to the connection request received by the first receiving unit, establish a BLE connection between the receiving terminal and the first terminal; a fourth obtaining unit, configured to obtain, by using a BLE data channel of the established BLE connection, Wi-Fi direct connection parameters sent by the first terminal; a second connection unit, configured to: after parameter configuration of the receiving terminal is performed based on the connection parameters, send a Wi-Fi direct establishment request to the first terminal, and perform handshake with the first terminal to establish Wi-Fi direct, where the handshake is initiated after the first terminal receives the Wi-Fi direct establishment request, the first terminal is a Wi-Fi direct group owner (GO), and the receiving terminal is a Wi-Fi direct group client (GC); and a second receiving unit, configured to receive, by using the established Wi-Fi direct, the file sent by the first terminal.

In a possible implementation, the receiving terminal further includes: a fifth processing unit, configured to: after the BLE connection is established, determine whether a Wi-Fi direct interface of the target terminal is occupied; and send, to the first terminal, information used to indicate whether the Wi-Fi direct interface of the target terminal is occupied.

In a possible implementation, the receiving terminal further includes: a fourth sending unit, configured to: after the Wi-Fi direct is established, send an account avatar of the target terminal to the first terminal.

In a possible implementation, the receiving terminal further includes: a fourth processing unit, configured to: if the broadcast packet includes information used to indicate that authentication needs to be performed on a terminal receiving the broadcast packet, before the first receiving unit receives the connection request that is used to establish a BLE connection and that is sent by the first terminal sending the file, receive an authentication request sent by the first terminal; and perform authentication on the authentication request, and send an authentication result to the first terminal.

According to a fifth aspect, an embodiment of the present invention provides a file sending terminal, including: a processor, a memory, one or more programs, a wireless connection module, an input apparatus, and a communications bus, where the processor, the memory, the wireless connection module, and the input apparatus are connected by using the communications bus and perform mutual communication; the wireless connection module includes a Bluetooth low energy (BLE) module and a high-fidelity direct (Wi-Fi direct) module that are configured to enable and perform a BLE function and a Wi-Fi direct function respectively; the input apparatus is configured to obtain an operation instruction of a user; and the one or more programs include instructions, where the one or more programs are stored in the memory and are configured by the processor to perform the following operations: obtaining, by using the input apparatus, instructions of enabling the BLE function and the Wi-Fi direct function by the user, and enabling the BLE function and the Wi-Fi direct function; controlling the BLE module to perform scanning on a BLE broadcast channel to obtain a broadcast packet sent by at least one second terminal; determining at least one discoverable second terminal based on the broadcast packet; obtaining a target terminal that is configured to receive a file and that is selected by the user from the at least one discoverable second terminal by using the input apparatus; controlling the BLE module to send a connection request to the target terminal, and establishing a BLE connection between the sending terminal and the target terminal; controlling the BLE module to send Wi-Fi direct connection parameters to the target terminal by using a BLE data channel of the established BLE connection; receiving a Wi-Fi direct establishment request sent by the target terminal, and after the Wi-Fi direct establishment request is received, performing handshake with the target terminal to establish Wi-Fi direct, where the Wi-Fi direct establishment request is sent by the target terminal to the first terminal after the target terminal performs parameter configuration of the target terminal based on the connection parameters, the first terminal is a Wi-Fi direct group owner (GO), and the target terminal is a Wi-Fi direct group client (GC); and controlling the Wi-Fi direct module to send the file to the target terminal by using the Wi-Fi direct established between the sending terminal and the target terminal.

In a possible implementation, after the first terminal establishes the BLE connection between the first terminal and the target terminal, the processor is further configured to perform the following steps: obtaining information used to indicate whether a Wi-Fi direct interface of the target terminal is occupied; and if the information indicates that the Wi-Fi direct interface of the target terminal is occupied, popping up, on a display screen of the sending terminal, a reminder message indicating that the file cannot be successfully sent temporarily, or if the information indicates that the Wi-Fi direct interface of the target terminal is not occupied, sending, by the sending terminal, the Wi-Fi direct connection parameters to the target terminal by using the BLE data channel of the BLE connection.

According to a sixth aspect, an embodiment of the present invention provides a file receiving terminal, including: a processor, a memory, a wireless connection module, one or more programs, an input apparatus, and a bus, where the processor, the memory, the wireless connection module, and the touchscreen are connected by using the communications bus and perform mutual communication; the wireless connection module includes a Bluetooth low energy (BLE) module and a high-fidelity direct (Wi-Fi direct) module that are configured to enable a BLE function and a Wi-Fi direct function respectively; the input apparatus is configured to receive an operation instruction of a user, and the one or more programs include instructions, where the one or more programs are stored in the memory and are configured by the processor to perform the following operations: obtaining, by using the input apparatus, instructions of enabling the BLE function and the Wi-Fi direct function by the user, and enabling the BLE function and the Wi-Fi direct function; controlling the BLE module to send a broadcast packet on a BLE broadcast channel; controlling the BLE module to receive, on the BLE broadcast channel, a connection request that is used to establish a BLE connection and that is sent by a first terminal, and establishing a BLE connection between the receiving terminal and the target terminal; controlling the BLE module to establish, in response to the connection request, the BLE connection between the receiving terminal and the first terminal; controlling the BLE module to obtain, by using a BLE data channel of the established BLE connection, Wi-Fi direct connection parameters sent by the first terminal; after parameter configuration of the receiving terminal is performed based on the connection parameters, sending a Wi-Fi direct establishment request to the first terminal, and performing handshake with the first terminal to establish Wi-Fi direct, where the handshake is initiated after the first terminal receives the Wi-Fi direct establishment request, the first terminal is a Wi-Fi direct group owner (GO), and the target terminal is a Wi-Fi direct group client (GC); and controlling the Wi-Fi direct module to receive, by using the established Wi-Fi direct, the file sent by the first terminal.

In a possible implementation, after the first terminal establishes the BLE connection between the first terminal and the receiving terminal, the processor is further configured to perform the following steps: determining whether a Wi-Fi direct interface of the target terminal is occupied; and sending, to the first terminal, information used to indicate whether the Wi-Fi direct interface of the target terminal is occupied.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 5-a to FIG. 5-d are schematic structural diagrams of a file sending terminal according to an embodiment of the present invention;

FIG. 6-a to FIG. 6-d are schematic structural diagrams of a file receiving terminal according to an embodiment of the present invention;

FIG. 7-a to FIG. 7-g are schematic diagrams of screens of a sending terminal and a receiving terminal according to an embodiment of the present invention;

DESCRIPTION OF EMBODIMENTS

The following describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

It should be noted that the terms used in the embodiments of the present invention are merely for the purpose of illustrating specific embodiments, and are not intended to limit the present invention. It should be understood that, although terms such as first and second are used in this specification to describe message services or modules, these message services or modules should not be limited by these terms, and these terms are used to only distinguish between each other. It should be further understood that, as used in this specification, unless the context clearly supports an exception, a singular form "a" is intended to also include a plural form. It should be further understood that "and/or" used in this specification indicates and includes any and all possible combinations of one or more associated listed items.

Figure 1:
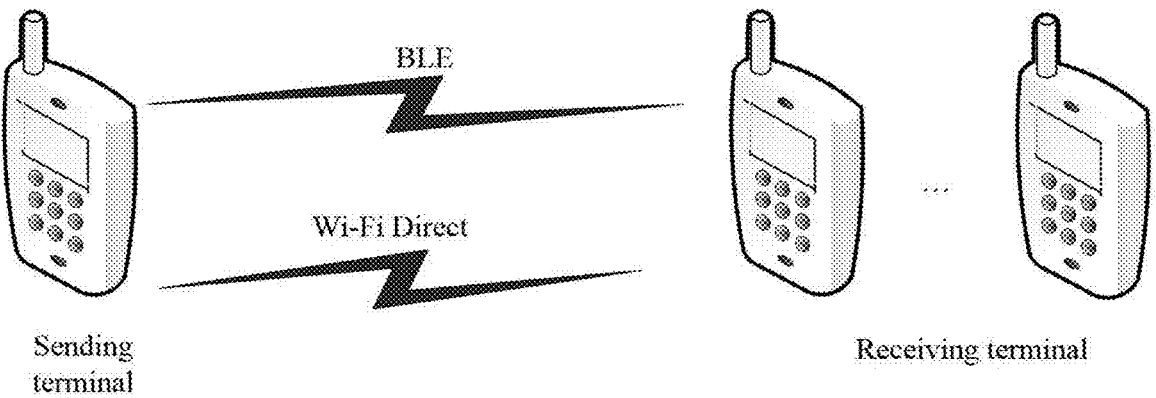
FIG. 1 is a schematic diagram of a network architecture according to an embodiment of the present invention.

For convenience of understanding the embodiments of the present invention, a network architecture of the embodiments of the present invention is described below first. Referring to FIG. 1, FIG. 1 is a schematic diagram of a network architecture according to an embodiment of the present invention. As shown in FIG. 1, the network architecture provided in this embodiment of the present invention is an architecture in which a file is transmitted between a sending terminal and a receiving terminal based on BLE and Wi-Fi direct, and may include: one sending terminal, and one or more receiving terminals. Specifically, when the sending terminal transmits a file, device discovery is first completed in a BLE manner, connection parameters such as handshake information required by a Wi-Fi direct connection are transmitted on a BLE data channel, then the Wi-Fi direct connection is established, and the file is transmitted by using the Wi-Fi direct.

It can be understood that the network architecture in FIG. 1 is only an implementation in this embodiment of the present invention. The network architecture in this embodiment of the present invention includes but is not only limited to the foregoing network architecture. Any network architecture that can implement a file sending method and a file receiving method in the present invention falls within the scope protected and covered by the present invention.

It should be noted that the sending terminal is configured to send a file to the receiving terminal, the receiving terminal is configured to receive the file sent by the sending terminal, and the sending terminal and the receiving terminal may be an electronic device having a BLE function and a Wi-Fi direct function, such as a smartphone, a tablet computer, a personal digital assistant (Personal Digital Assistant, PDA), or a laptop portable computer.

Figure 2:
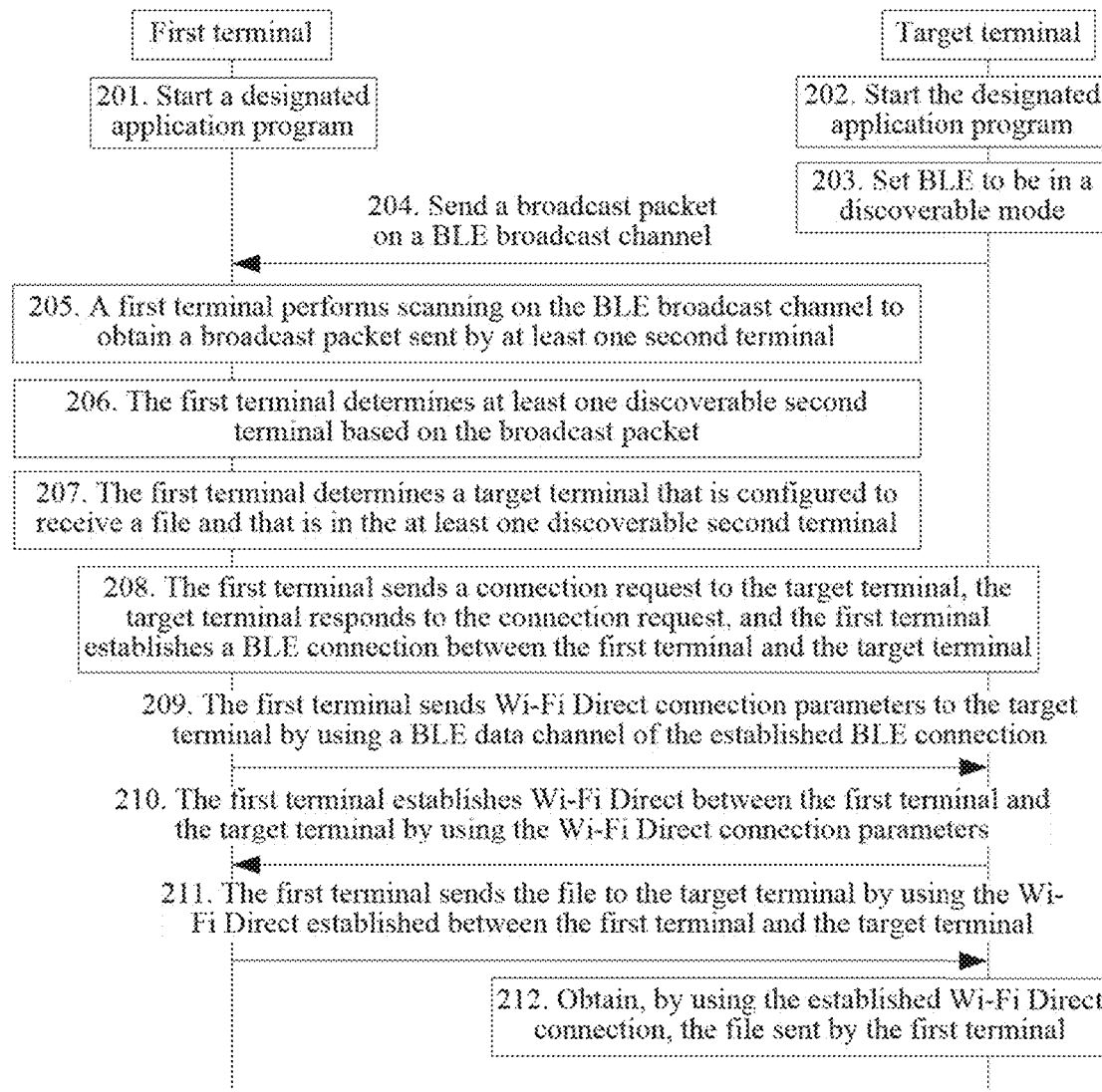
FIG. 2 is a schematic flowchart of a file sharing method according to an embodiment of the present invention.

Specifically, referring to FIG. 2, FIG. 2 is a schematic flowchart of a file sharing method according to an embodiment of the present invention. The file sharing method includes a file sending method performed by a sending terminal, and a file receiving method performed by a receiving terminal that sends a broadcast packet on a BLE broadcast channel.

In the following, a first terminal is used to represent the foregoing sending terminal, and a target terminal is used to represent the foregoing receiving terminal. It should be noted that there may be one or more second terminals sending broadcast packets, and a broadcast packet received by the first terminal on a BLE broadcast channel may be from a target terminal of the second terminals, or may be from a non-target terminal of the second terminals. A second terminal sending a broadcast packet on the BLE broadcast channel may need to perform authentication on a terminal receiving the broadcast packet, and only a terminal on which authentication is successfully performed can discover a second terminal sending the broadcast packet. Certainly, a second terminal sending a broadcast packet on the BLE broadcast channel may not need to perform authentication on a terminal receiving the broadcast packet. That is, as long as a terminal receives the broadcast packet, the terminal can discover a second terminal sending the broadcast packet. When discovering at least one second terminal, the first terminal may send a file to all discoverable second terminals. In this case, all the discoverable second terminals are target terminals. Certainly, the first terminal may send a file to some discoverable second terminals. In this case, the some discoverable second terminals are target terminals.

In FIG. 2, the first terminal enables a Bluetooth low energy BLE function and a Wireless Direct Wi-Fi direct function. For example, as shown in FIG. 7-a, BLE and Wi-Fi direct are set to be in a highlighted state in the first terminal, namely, the BLE function and the Wi-Fi direct function are enabled. The second terminal also enables the Bluetooth low energy BLE function and the Wireless Direct Wi-Fi direct function. As shown in FIG. 7-a, BLE and Wi-Fi direct are set to be in the highlighted state in the second terminal, namely, the BLE function and the Wi-Fi direct function are enabled. Specifically, when the first terminal shares a file, the following steps may be included.

201. The first terminal starts a designated application program.

For example, if MagicLink shown in FIG. 7-*a* is the designated application program, triggering may be performed by clicking an icon of MagicLink to start MagicLink, a display screen of the first terminal is switched to what is shown in FIG. 7-*b*, and a button of MagicLink is clicked based on a reminder in FIG. 7-*b* to enable Wi-Fi direct and BLE, so as to enable a Magiclink sharing function. After Wi-Fi direct and BLE are enabled, the first terminal begins to discover another device, and the display screen of the first terminal is switched to what is shown in FIG. 7-*c*.

202. The second terminal starts the designated application program.

For example, if MagicLink shown in FIG. 7-*a* is the designated application program, MagicLink may be started by clicking the icon of MagicLink.

It should be noted that the designated application program is one example that is used to complete the file sending method and the file receiving method disclosed in the embodiments of the present invention and that is designated by a user. The first terminal and the second terminal both start the designated application program, and share files by using the designated application program. Optionally, the first terminal may send a file by using a sending function in the designated application program, and the second terminal receives a file by using a receiving function in the designated application program.

Optionally, in some possible implementations of the present invention, before the first terminal starts the designated application program, when it is determined that a file needs to be sent from the first terminal, a first display instruction may be triggered when a slide operation of sliding from the bottom of the display screen of the first terminal to the middle is obtained. A shared application program display screen including the designated application program is displayed based on the first display instruction. That is, a plurality of application programs used for file sharing, for example, including application programs such as the designated application program in this embodiment, WeChat, and QQ may be displayed on the shared application program display screen.

A triggering instruction of triggering the designated application program to be started is obtained, and the triggering instruction may be a click operation of clicking an icon of the designated application program on the shared application program display screen.

The first display instruction is triggered in the manner of sliding from the bottom of the display screen of the first terminal to the middle, and operations are concise and convenient.

203. The second terminal sets BLE to be in a discoverable mode.

For example, FIG. 7-*f* is a schematic diagram of setting of a BLE discovery mode. If an Enable button in FIG. 7-*f* is clicked, BLE is set to be in the discoverable mode, so as to be discoverable to everyone by default. Certainly, the first terminal that can discover the target terminal may be limited. When a Cancel button is clicked, no terminal can discover the target terminal.

204. The second terminal sends a broadcast packet on a BLE broadcast channel.

The broadcast packet may include an address of the second terminal, and an account identifier of an account of the designated application program in the second terminal, and the account identifier may be an account number, a nickname, or the like.

205. The first terminal performs scanning on the BLE broadcast channel to obtain a broadcast packet sent by at least one second terminal.

The second terminal is a terminal that enables the BLE function and that sends the broadcast packet on the BLE broadcast channel, and there may be at least one second terminal that enables the BLE function and that sends the broadcast packet on the BLE broadcast channel. Therefore, the first terminal may perform scanning on the BLE broadcast channel to obtain the broadcast packet sent by the at least one second terminal. Because each second terminal sends a broadcast packet, the first terminal can obtain, through scanning, at least one broadcast packet sent by at least one second terminal.

206. The first terminal determines at least one discoverable second terminal based on the broadcast packet.

Because the first terminal can obtain, through scanning, at least one broadcast packet sent by at least one second terminal, the first terminal may determine at least one discoverable second terminal.

Specifically, the first terminal parses the broadcast packet, to obtain the account identifier of the account of the designated application program in the discoverable second terminal.

For example, the account identifier of the account of the designated application program in the second terminal may be an account number or an account nickname. For example, the nickname of the account corresponding to the designated application program of the second terminal may be jzyRecv.

207. The first terminal determines a target terminal that is configured to receive the file and that is in the at least one discoverable second terminal.

For example, preview information corresponding to the account of the designated application program of the at least one second terminal is displayed in a candidate receiving terminal preview area of the designated application program of the first terminal, and the preview information includes the account identifier.

For example, if the nickname of the account corresponding to the designated application program of the second terminal is jzyRecv, as shown in FIG. 7-*d*, an account nickname jzyRecv corresponding to an account of a target application program of the second terminal is displayed in an optional receiving terminal preview area of the designated application program of the first terminal. It can be understood that, if a plurality of discoverable second terminals are discovered, nicknames of all the second terminals discovered by the first terminal are displayed in the optional receiving terminal preview area of the designated application program of the first terminal.

Further, a second terminal configured to receive the file is determined as the target terminal based on the preview information.

For example, if the nickname jzyRecv in FIG. 7-*d* is clicked, a second terminal corresponding to the nickname jzyRecv is determined as the target terminal.

When there are a plurality of second terminals, target terminals may be all the second terminals, or may be some of the second terminals.

Specifically, the second terminal configured to receive the file may be determined by using a method for clicking an account identifier in preview information, and a second terminal corresponding to an account identifier on which a click operation is performed is used as the target terminal.

208. The first terminal sends a connection request to the target terminal, the target terminal responds to the connection request, and the first terminal establishes a BLE connection between the first terminal and the target terminal.

A method for establishing the BLE connection between the first terminal and the target terminal is a solution in the prior art, and details are not described herein.

209. The first terminal sends Wi-Fi direct connection parameters to the target terminal by using a BLE data channel of the BLE connection.

The connection parameters may include parameters prepared for the target terminal, such as Wi-Fi direct handshake information, an IP address assigned by the first terminal to the target terminal, and a designated communication channel.

210. The first terminal and the target terminal establish Wi-Fi direct by using the Wi-Fi direct connection parameters. Specifically, the first terminal receives a Wi-Fi direct establishment request sent by the target terminal, and after receiving the Wi-Fi direct establishment request, performs handshake with the target terminal to establish Wi-Fi direct, where the Wi-Fi direct establishment request is initiated by the target terminal to the first terminal after the target terminal performs parameter configuration of the target terminal based on the connection parameters.

Specifically, the first terminal is used as a Wi-Fi direct group owner (GO), and the target terminal is used as a Wi-Fi direct group client (GC). The target terminal performs parameter configuration of the target terminal based on the connection parameters, and initiates the Wi-Fi direct establishment request to the first terminal after the configuration is completed. After receiving the request, the first terminal performs handshake with the target terminal to complete establishment of a Wi-Fi direct communication link.

211. The first terminal sends the file to the target terminal by using the Wi-Fi direct established between the first terminal and the target terminal.

212. The target terminal obtains, by using the established Wi-Fi direct connection, the file sent by the first terminal.

Optionally, in some possible implementations of the present invention, the first terminal sends the file to the target terminal by using the Wi-Fi direct, and after the sending is completed, information indicating successful sending may be used as a reminder on the display screen, as shown in FIG. 7-e.

Optionally, in some possible implementations of the present invention, when the first terminal transmits the file to the target terminal by using the Wi-Fi direct, a reminder window indicating whether to receive the file may be popped up on the display screen of the target terminal, and the user may choose to receive the file or choose to reject receiving the file. If the user chooses to receive the file, step 211 is performed. If the user chooses to reject receiving the file, the transmitting the file to the target terminal may be ended, and correspondingly, a reminder window may also be popped up in the first terminal, to remind that the target terminal rejects receiving the file, and the transmitting the file to the target terminal is ended.

Optionally, in some possible implementations of the present invention, after the target terminal receives the file completely, a reminder message indicating that the file is successfully received may be popped up. As shown in FIG. 7-g, after the target terminal successfully receives the file sent by the first terminal, successfully receiving one picture shared by "jiangzy" with you is displayed on the display screen.

The target terminal may send, to the first terminal, a feedback message indicating that file transmission is completed. Moreover, as shown in FIG. 7-e, reminder information indicating successful sending is displayed below a nickname jiangzy of an account of the target terminal on the display screen.

In this embodiment of the present invention, when the first terminal needs to send the file to the target terminal, the first terminal first performs scanning on the BLE broadcast channel, to obtain the broadcast packet sent by the second terminal, then determines a discoverable second terminal based on the broadcast packet, and then determines, in the discoverable second terminal, the target terminal receiving the file. Subsequently, the first terminal sends the Wi-Fi direct connection parameters to the target terminal by using the BLE connection established between the first terminal and the target terminal; the first terminal establishes the Wi-Fi direct between the first terminal and the target terminal by using the Wi-Fi direct connection parameters; and the first terminal sends the file to the target terminal by using the established Wi-Fi direct. BLE has only three broadcast channels, far less than broadcast channels of classic Bluetooth or Wi-Fi direct. Therefore, use of the technical solution provided in this embodiment of the present invention facilitates quick discovery of a discoverable second terminal. Additionally, because the first terminal scans the broadcast packet of the second terminal to discover the discoverable second terminal and determines the target terminal, a method for determining the target terminal is quite simple, and a process is quite short, so as to help quickly determine the target terminal. Additionally, after the first terminal sends the Wi-Fi direct connection parameters to the target terminal, the target terminal can directly initiate the Wi-Fi direct establishment request, and a Wi-Fi direct establishment time can also be shortened. The file is transmitted in a Wi-Fi direct manner, and a file transmission speed and efficiency are ensured. Therefore, the technical solution provided in this embodiment of the present invention facilitates improvement in file sharing efficiency.

Figure 3:
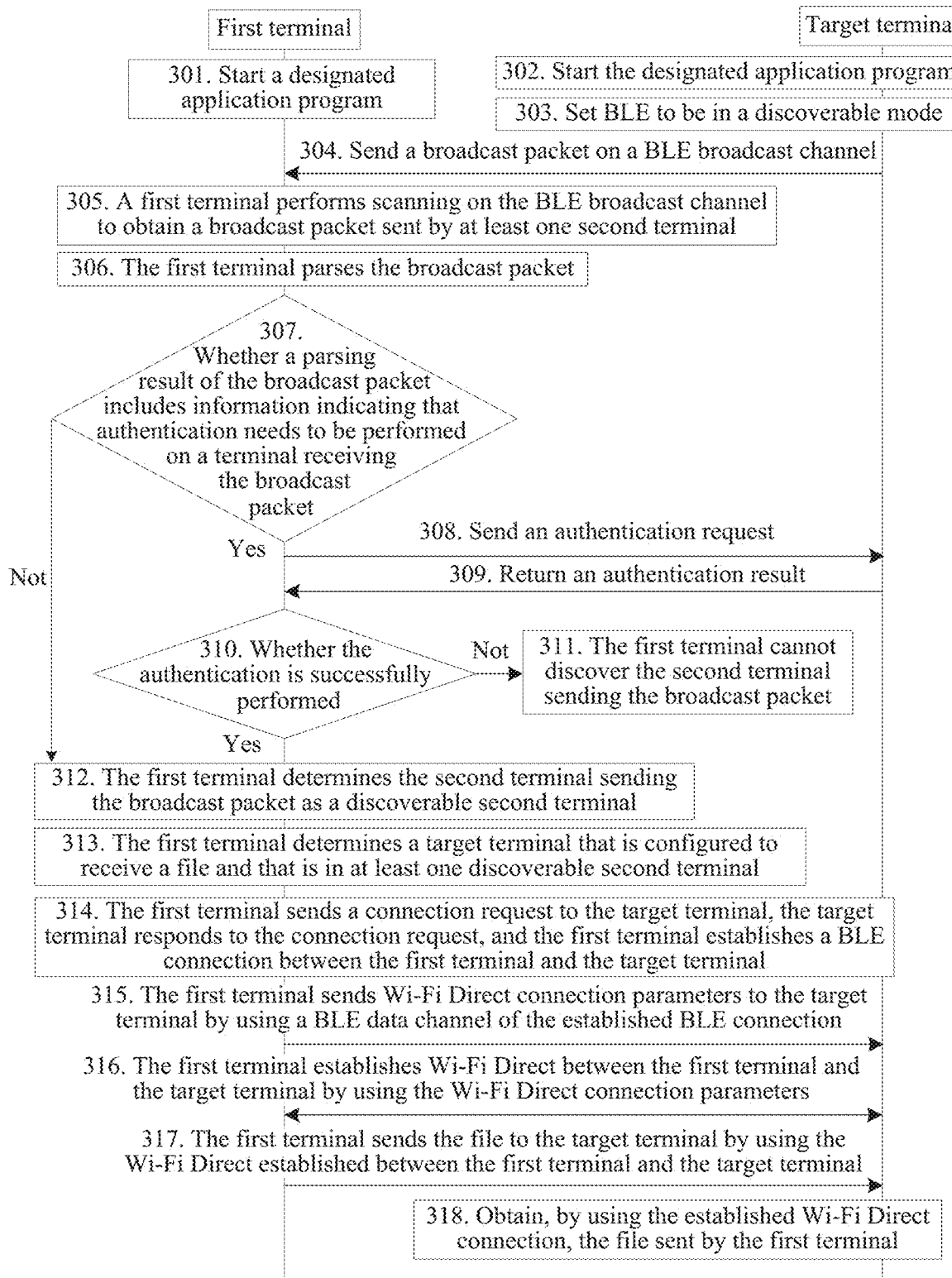
FIG. 3 is a schematic flowchart of another file sharing method according to an embodiment of the present invention.

Referring to FIG. 3, FIG. 3 is a schematic flowchart of another file sharing method according to an embodiment of the present invention. A process shown in FIG. 3 is different from a process shown in FIG. 2 in that, a second terminal needs to perform authentication on a first terminal receiving a broadcast packet sent by the second terminal, and only the first terminal on which authentication is successfully performed can discover the second terminal.

When a file is shared, step 301 to step 305 are the same as step 201 to step 205 in FIG. 2, and details are not described herein again.

The process of the file sharing method shown in FIG. 3 further includes the following steps.

306. The first terminal parses the broadcast packet obtained by the first terminal on the broadcast channel.

307. Determine whether a parsing result of the broadcast packet includes information indicating that authentication needs to be performed on the first terminal receiving the broadcast packet.

308. If a determining result of step 307 is yes, the first terminal initiates a BLE connection request to the second terminal sending the broadcast packet, and sends an authentication request to the second terminal on a BLE data channel after a BLE connection is established.

The authentication request carries to-be-verified information that needs to be authenticated. For example, if the second terminal sets that only a terminal corresponding to a contact in an address book can discover the second terminal, authentication information may include contact information or a phone number corresponding to the first terminal. The second terminal verifies the first terminal based on the obtained authentication request.

309. The first terminal obtains an authentication result of performing authentication on the authentication request by the second terminal.

Specifically, the second terminal may return the authentication result to the first terminal by using the BLE data channel.

310. Determine whether the authentication is successfully performed.

311. If the authentication is unsuccessfully performed, the first terminal cannot discover the second terminal sending the broadcast packet.

312. If the authentication is successfully performed, the first terminal determines the second terminal sending the broadcast packet as a discoverable second terminal.

When the authentication is successfully performed, preview information corresponding to an account of a designated application program of the corresponding second terminal is displayed in an optional receiving terminal preview area of the designated application program of the first terminal. Subsequent step 313 to step 318 are the same as step 207 to step 212 in FIG. 2. For a specific process, refer to the foregoing description. Details are not described herein again.

In the solution provided in this embodiment of the present invention, a terminal that can discover a second terminal is limited, and only a terminal on which authentication is performed successfully can discover the second terminal, so as to help improve communication security and prevent the second terminal from being discovered by an unauthorized user on which authentication is performed unsuccessfully, thereby facilitating reduction in harassment on the second terminal by the unauthorized user.

Figure 4:
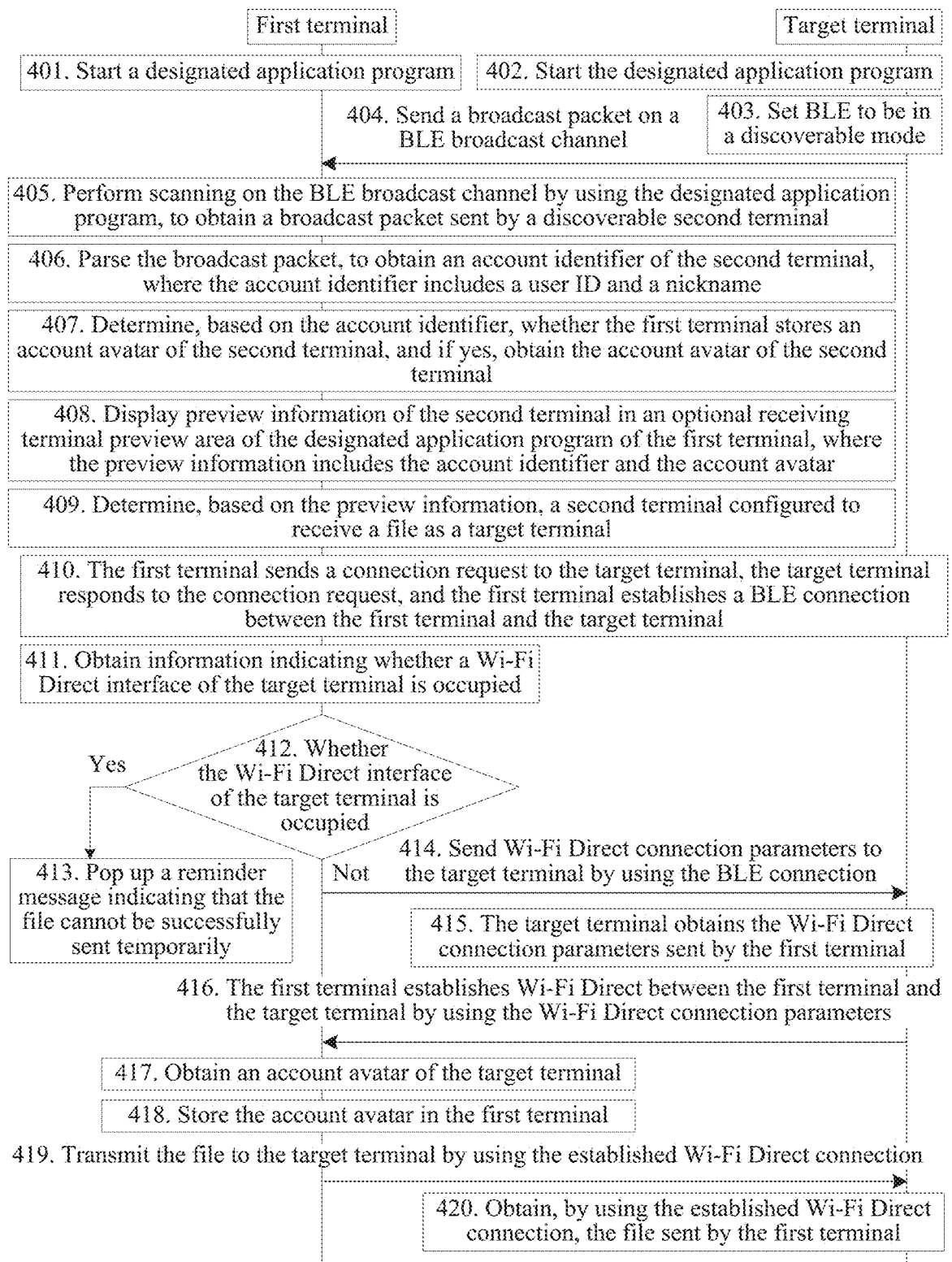
FIG. 4 is a schematic flowchart of another file sharing method according to an embodiment of the present invention.

Referring to FIG. 4, FIG. 4 is a schematic flowchart of another file sharing method according to an embodiment of the present invention. Specifically, a first terminal shares a file with a target terminal. Both the first terminal and a second terminal enable a BLE function and a Wi-Fi direct function. The file sharing method may include the following steps.

401. The first terminal starts a designated application program.

402. The second terminal starts the designated application program.

403. The second terminal sets BLE to be in a discoverable mode.

404. The second terminal sends a broadcast packet on a BLE broadcast channel.

405. The first terminal performs scanning on the BLE broadcast channel to obtain the broadcast packet sent by the second terminal.

406. Parse the broadcast packet, to obtain an account identifier of the second terminal. The account identifier includes a user ID and a nickname.

407. Determine, based on the account identifier, whether the first terminal stores an account avatar of the second terminal, and if yes, obtain the account avatar of the second terminal.

408. Display preview information of the second terminal in an optional receiving terminal preview area of the designated application program of the first terminal, where the preview information includes the account identifier and the account avatar. The second terminal displayed in the optional receiving terminal preview area is a discoverable second terminal.

409. Determine, based on the preview information, a second terminal configured to receive the file as a target terminal.

It should be noted that, when there are a plurality of second terminals, target terminals may be all the second terminals, or may be some of the second terminals.

410. The first terminal sends a connection request to the target terminal, the target terminal responds to the connection request, and the first terminal establishes a BLE connection between the first terminal and the target terminal.

411. The first terminal obtains information used to indicate whether a Wi-Fi direct interface of the target terminal is occupied. Specifically, after the BLE connection is established, the first terminal queries the target terminal for whether the Wi-Fi direct is occupied, and the target terminal responds to the first terminal with the information indicating whether the Wi-Fi direct interface is occupied. The information is used to indicate whether the Wi-Fi direct interface of the target terminal is occupied.

412. Determine, based on the obtained information indicating whether the Wi-Fi direct interface of the target terminal is occupied, whether the Wi-Fi direct interface of the target terminal is occupied.

If yes, step 413 is performed, or if not, step 414 is performed.

413. When the Wi-Fi direct interface of the target terminal is occupied, pop up, on a display screen of the first terminal, a reminder message indicating that the file cannot be successfully sent temporarily, and the first terminal stops sending Wi-Fi direct connection parameters to the target terminal.

414. When the Wi-Fi direct interface of the target terminal is not occupied, the first terminal sends, to the target terminal by using the BLE connection, connection parameters including Wi-Fi direct handshake information and an IP address that is assigned to the target terminal.

415. The target terminal obtains the connection parameters sent by the first terminal.

416. The first terminal establishes Wi-Fi direct between the first terminal and the target terminal by using the Wi-Fi direct connection parameters. Specifically, the target terminal configures parameters in the target terminal by using the obtained connection parameters, and initiates a Wi-Fi direct establishment request to the first terminal after the configuration is completed. After receiving the request, the first terminal performs handshake with the target terminal to establish the Wi-Fi direct. The first terminal is used as a Wi-Fi direct group owner (GO), and the target terminal is used as a Wi-Fi direct group client (GC).

417. Obtain an account avatar of the target terminal.

418. Store the account avatar in the first terminal.

419. The first terminal transmits the file to the target terminal by using the Wi-Fi direct connection.

420. The target terminal obtains, by using the Wi-Fi direct connection, the file sent by the first terminal.

Steps 417 and 418 and steps 419 and 420 are not performed in a special sequence.

In the solution provided in this embodiment of the present invention, the account avatar of the account of the designated application program of the second terminal is displayed in the preview information, so as to help quickly position and distinguish the second terminal from optional receiving terminals, thereby improving identifiability of the second terminal, and facilitating improvement in interactivity. Additionally, after the BLE connection is established between the first terminal and the target terminal, the information indicating whether the Wi-Fi direct interface is occupied is obtained, and when the Wi-Fi direct interface is occupied, the reminder message indicating that the file cannot be successfully sent temporarily is popped up, and the Wi-Fi direct connection parameters are stopped from being sent to the target terminal, so that Wi-Fi direct occupancy information can be understood as soon as possible, so as to reduce BLE transmission resources, simplify the process, and provide better user experience.

Referring to FIG. 5-a, FIG. 5-a is a schematic structural diagram of a file sending terminal 500 according to an embodiment of the present invention. As shown in FIG. 5-a, the sending terminal 500 is configured to send a file to a target terminal, the sending terminal 500 enables a Bluetooth low energy BLE function and a Wireless Direct Wi-Fi direct function, and the sending terminal 500 may include: a scanning unit 501, a first determining unit 502, a second determining unit 503, a first processing unit 504, a first sending unit 505, a second processing unit 506, and a second sending unit 507.

The scanning unit 501 is configured to perform scanning on a BLE broadcast channel to obtain a broadcast packet sent by at least one second terminal.

The first determining unit 502 is configured to determine at least one discoverable second terminal based on the broadcast packet.

Optionally, the first determining unit 502 may be specifically configured to: parse the broadcast packet; and if a parsing result of the broadcast packet does not include information indicating that authentication needs to be performed on a terminal receiving the broadcast packet, determine, by the sending terminal, a second terminal sending the broadcast packet as a discoverable second terminal.

Optionally, the first determining unit 502 may be specifically configured to: parse the broadcast packet; if a parsing result of the broadcast packet includes information indicating that authentication needs to be performed on a terminal receiving the broadcast packet, send an authentication request to a second terminal sending the broadcast packet, and obtain an authentication result of performing authentication on the authentication request by the second terminal; and if the authentication result indicates that the authentication succeeds, determine the second terminal sending the broadcast packet as a discoverable second terminal.

The second determining unit 503 is configured to determine a target terminal that is configured to receive the file and that is in the at least one discoverable second terminal.

The first processing unit 504 is configured to send a connection request to the target terminal, and establish a BLE connection between the sending terminal and the target terminal.

The first sending unit 505 is configured to send high-fidelity direct (Wi-Fi direct) connection parameters to the target terminal by using a BLE data channel of the BLE connection.

The second processing unit 506 is configured to receive a Wi-Fi direct establishment request sent by the target terminal, and after the Wi-Fi direct establishment request is received, perform handshake with the target terminal to establish Wi-Fi direct, where the Wi-Fi direct establishment request is sent by the target terminal to the sending terminal after the target terminal performs parameter configuration of the target terminal based on the connection parameters, the sending terminal is a Wi-Fi direct group owner (GO), and the target terminal is a Wi-Fi direct group client (GC).

The second sending unit 507 is configured to send the file to the target terminal by using the Wi-Fi direct.

It can be understood that functions of the units of the sending terminal 500 in this embodiment may be specifically implemented according to the method in the foregoing method embodiment. For a specific implementation process, refer to related descriptions of the foregoing method embodiment. Details are not described herein again.

In this embodiment of the present invention, device discovery and file transmission are completed in a BLE manner and a Wi-Fi direct manner one after another. BLE has only three broadcast channels, far less than broadcast channels of classic Bluetooth or Wi-Fi direct. Therefore, use of the technical solution provided in this embodiment of the present invention facilitates quick discovery of a receiving terminal, and reduction in a time length of discovering the receiving terminal. Additionally, because the sending terminal scans the broadcast packet of the second terminal to discover the discoverable second terminal and determines the target terminal, a method for determining the target terminal is quite simple, and a process is quite short, so as to help quickly determine the target terminal. Additionally, after the sending terminal sends the Wi-Fi direct connection parameters to the target terminal, the target terminal can directly initiate the Wi-Fi direct establishment request, and a Wi-Fi direct establishment time can also be shortened. The file is transmitted in the Wi-Fi direct manner, and a file transmission speed and efficiency are ensured. Therefore, the technical solution provided in this embodiment of the present invention facilitates improvement in file sharing efficiency.

Optionally, in some possible implementations of the present invention, as shown in FIG. 5-b, the sending terminal 500 may further include:

a first obtaining unit 508, configured to: after the Wi-Fi direct is established, obtain an account avatar of the target terminal;

a storage unit 509, configured to store the account avatar, and a correspondence between the target terminal and the account avatar in the first terminal; and a first display unit 510, configured to: before the target terminal configured to receive the file is determined, display an account avatar of the at least one discoverable second terminal, where the account avatar of the at least one discoverable second terminal is stored in the sending terminal.

An account avatar of any one of the at least one discoverable second terminal stored in the sending terminal is displayed, so as to help quickly position and distinguish a different second terminal from the at least one discoverable second terminal, thereby improving identifiability of the second terminal.

Optionally, in some possible implementations of the present invention, as shown in FIG. 5-c, the sending terminal 500 may further include: a second obtaining unit 511, a third processing unit 512, a second display unit 513, and a starting unit 514.

The second obtaining unit 511 is configured to: before the scanning unit performs scanning on the BLE broadcast channel to obtain at least one broadcast packet sent by the at least one second terminal, obtain a touch track on a display screen of the sending terminal.

The third processing unit 512 is configured to: when the touch track obtained by the second obtaining unit is a touch track sliding from the bottom of the display screen of the sending terminal to the middle, perform triggering to generate a first instruction.

The second display unit 513 is configured to display, based on the first instruction generated by the third processing unit, a shared application program preview screen including the designated application program, on the display screen of the sending terminal.

The starting unit 514 is configured to obtain a touch instruction for the designated application program displayed by the second display unit, and start the designated application program.

The first display instruction is triggered in the manner of sliding from the bottom of the display screen of the first terminal to the middle, and operations are concise and convenient.

Optionally, in some possible implementations of the present invention, as shown in FIG. 5-*d*, the sending terminal 500 may further include: a third obtaining unit 515 and a fourth processing unit 516.

The third obtaining unit 515 is configured to: after the BLE connection is established, obtain information used to indicate whether a Wi-Fi direct interface of the target terminal is occupied.

The fourth processing unit 516 is configured to: if the information indicates that the Wi-Fi direct interface of the target terminal is occupied, pop up, on the display screen of the sending terminal, a reminder message indicating that the file cannot be successfully sent temporarily, or if the information indicates that the Wi-Fi direct interface of the target terminal is not occupied, send, by the sending terminal, the Wi-Fi direct connection parameters to the target terminal by using the BLE data channel of the BLE connection.

In the solution provided in this embodiment of the present invention, after the BLE connection is established between the first terminal and the target terminal, the information indicating whether the Wi-Fi direct interface is occupied is obtained, and when the Wi-Fi direct interface is occupied, the reminder message indicating that the file cannot be successfully sent temporarily is popped up, and the Wi-Fi direct connection parameters are stopped from being sent to the target terminal, so that Wi-Fi direct occupancy information can be understood as soon as possible, so as to reduce BLE transmission resources, simplify the process, and provide better user experience.

Referring to FIG. 6-*a*, FIG. 6-*a* is a schematic structural diagram of a file receiving terminal 600 according to an embodiment of the present invention. As shown in FIG. 6-*a*, the receiving terminal 600 is configured to receive a file, the receiving terminal 600 enables a Bluetooth low energy BLE function and a Wireless Direct Wi-Fi direct function, and the receiving terminal 600 may include:

- a setting unit 601, configured to set Bluetooth low energy (BLE) to be in a discoverable mode;
- a third sending unit 602, configured to send a broadcast packet on a BLE broadcast channel;
- a first receiving unit 603, configured to receive a connection request that is used to establish a BLE connection and that is sent by a first terminal;
- a first connection unit 604, configured to: in response to the connection request received by the first receiving unit, establish a BLE connection between the receiving terminal and the first terminal;
- a fourth obtaining unit 605, configured to obtain, by using a BLE data channel of the established BLE connection, Wi-Fi direct connection parameters sent by the first terminal;
- a second connection unit 606, configured to: after parameter configuration of the receiving terminal is performed based on the connection parameters, send a Wi-Fi direct establishment request to the first terminal, and perform handshake with the first terminal to establish Wi-Fi direct, where the handshake is initiated after the first terminal receives the Wi-Fi direct establishment request, the first terminal is a Wi-Fi direct group owner (GO), and the receiving terminal is a Wi-Fi direct group client (GC); and
- a second receiving unit 607, configured to receive, by using the established Wi-Fi direct, the file sent by the first terminal.

It can be understood that functions of the units of the receiving terminal 600 in this embodiment may be specifically implemented according to the method in the foregoing method embodiment. For a specific implementation process, refer to related descriptions of the foregoing method embodiment. Details are not described herein again.

In this embodiment of the present invention, device discovery and file transmission are completed in a BLE manner and a Wi-Fi direct manner one after another. The file is transmitted in the Wi-Fi direct manner, and a file transmission speed and efficiency are ensured. BLE has only three broadcast channels, far less than a quantity of broadcast channels of classic Bluetooth or Wi-Fi direct. Additionally, after a sending terminal sends the Wi-Fi direct connection parameters to a target terminal, the target terminal can directly initiate the Wi-Fi direct establishment request, and a Wi-Fi direct establishment time can also be shortened. Therefore, use of the technical solution provided in this embodiment of the present invention facilitates quick discovery by the sending terminal, and reduction in a time length of discovery by the sending terminal, so as to facilitate improvement in file receiving efficiency.

Optionally, in some possible implementations of the present invention, as shown in FIG. 6-*b*, the receiving terminal 600 may further include:

- a fourth sending unit 608, configured to: after the Wi-Fi direct is established, send an account avatar of the target terminal to the first terminal.

Optionally, in some possible implementations of the present invention, as shown in FIG. 6-*c*, the receiving terminal 600 may further include:

- a fourth processing unit 609, configured to: if the broadcast packet includes information used to indicate that authentication needs to be performed on a terminal receiving the broadcast packet, before the first receiving unit receives the connection request that is used to establish a BLE connection and that is sent by the first terminal sending the file, receive an authentication request sent by the first terminal; and perform authentication on the authentication request, and send an authentication result to the first terminal.

Optionally, in some possible implementations of the present invention, as shown in FIG. 6-*d*, the receiving terminal 600 may further include:

- a fifth processing unit 610, configured to: after the BLE connection is established, determine whether a Wi-Fi direct interface of the target terminal is occupied; and send, to the first terminal, information used to indicate whether the Wi-Fi direct interface of the target terminal is occupied, so that the first terminal may understand Wi-Fi direct occupancy information as soon as possible, so as to reduce BLE transmission resources, simplify the process, and provide better user experience.

Figure 8:
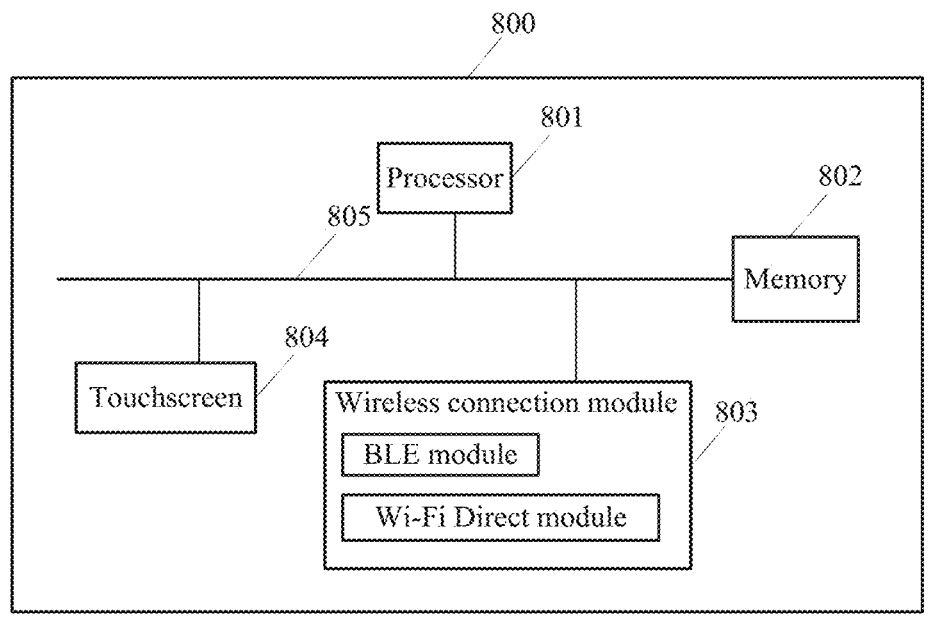
FIG. 8 is a schematic structural diagram of a file sending terminal according to an embodiment of the present invention.

Referring to FIG. 8, FIG. 8 is a schematic structural diagram of a file sending terminal 800 according to an embodiment of the present invention. As shown in FIG. 8, the sending terminal 800 is configured to send a file to a receiving terminal serving as a target terminal, and the sending terminal 800 includes: a processor 801, a memory 802, a wireless connection module 803, an input apparatus 804 (a touchscreen is used as an example), a communications bus 805, and one or more programs.

The processor 801, the memory 802, the wireless connection module 803, and the touchscreen 804 are connected by using the communications bus 805 and perform mutual communication. The wireless connection module 803 may include a BLE module and a Wi-Fi direct module that are configured to enable and perform a BLE function and a Wi-Fi direct function respectively. The input apparatus 804 may be configured to receive an operation instruction of a user. The memory 802 includes al least one of the following: a random access memory, a non-volatile memory, and an external memory. The one or more programs include instructions, where the one or more programs are stored in the memory and are configured by the processor to perform the file sending method specifically disclosed in the method embodiment of the present invention.

During specific implementation, instructions of enabling the BLE function and the Wi-Fi direct function by the user are obtained by using the input apparatus, and the BLE function and the Wi-Fi direct function are enabled.

The BLE module is controlled to perform scanning on a BLE broadcast channel to obtain a broadcast packet sent by at least one second terminal.

At least one discoverable second terminal is determined based on the broadcast packet.

A target terminal that is configured to receive the file and that is selected by the user from the at least one discoverable second terminal by using the input apparatus is obtained.

The BLE module is controlled to send a connection request to the target terminal, and a BLE connection between the sending terminal and the target terminal is established.

The BLE module is controlled to send Wi-Fi direct connection parameters to the target terminal by using a BLE data channel of the established BLE connection.

A Wi-Fi direct establishment request sent by the target terminal is received, and after the Wi-Fi direct establishment request is received, handshake with the target terminal is performed to establish Wi-Fi direct, where the Wi-Fi direct establishment request is sent by the target terminal to the first terminal after the target terminal performs parameter configuration of the target terminal based on the connection parameters; and the first terminal is a Wi-Fi direct group owner (GO), and the target terminal is a Wi-Fi direct group client (GC).

The Wi-Fi direct module is controlled to send the file to the target terminal by using the Wi-Fi direct established between the sending terminal and the target terminal.

In this embodiment, the sending terminal 800 may be further configured to perform the following steps: obtaining information used to indicate whether a Wi-Fi direct interface of the target terminal is occupied; and if the information indicates that the Wi-Fi direct interface of the target terminal is occupied, popping up, on a display screen of the sending terminal, a reminder message indicating that the file cannot be successfully sent temporarily, or if the information indicates that the Wi-Fi direct interface of the target terminal is not occupied, sending, by the sending terminal, the Wi-Fi direct connection parameters to the target terminal by using the BLE data channel of the BLE connection.

In this embodiment, the sending terminal 800 may be further configured to perform the solution described in the method embodiment. Refer to the description in the method embodiment. Details are not described herein again.

Figure 9:
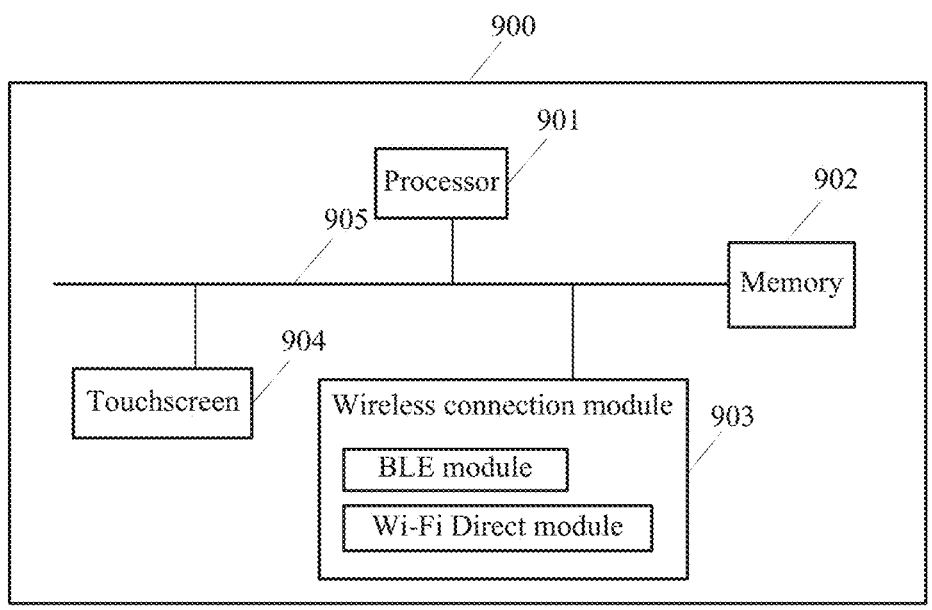
FIG. 9 is a schematic structural diagram of a file receiving terminal according to an embodiment of the present invention.

Referring to FIG. 9, FIG. 9 is a schematic structural diagram of a file receiving terminal 900 according to an embodiment of the present invention. As shown in FIG. 9, the receiving terminal 900 is configured to obtain a file sent by a sending terminal. The receiving terminal 900 includes: a processor 901, a memory 902, a wireless connection module 903, an input apparatus 904 (a touchscreen is used as an example), a communications bus 905, and one or more programs.

The processor 901, the memory 902, the wireless connection module 903, and the input apparatus 904 are connected by using the communications bus 905 and perform mutual communication. The wireless connection module 903 may include a BLE module and a Wi-Fi direct module that are configured to enable a BLE function and a Wi-Fi direct function respectively. The input apparatus 904 may be configured to receive an operation instruction of a user. The memory 902 includes at least one of the following: a random access memory, a non-volatile memory, and an external memory. The one or more programs include instructions, where the one or more programs are stored in the memory and are configured by the one or more processors to perform the file receiving method specifically disclosed in the method embodiment of the present invention. The file receiving method includes the following steps.

During specific implementation, instructions of enabling the BLE function and the Wi-Fi direct function by the user are obtained by using the input apparatus, and the BLE function and the Wi-Fi direct function are enabled.

The BLE module is controlled to send a broadcast packet on a BLE broadcast channel.

The BLE module is controlled to receive, on the BLE broadcast channel, a connection request that is used to establish a BLE connection and that is sent by a first terminal, and a BLE connection between the receiving terminal and the target terminal is established.

The BLE module is controlled to establish, in response to the connection request, the BLE connection between the receiving terminal and the first terminal.

The BLE module is controlled to obtain, by using a BLE data channel of the established BLE connection, Wi-Fi direct connection parameters sent by the first terminal.

After parameter configuration of the receiving terminal is performed based on the connection parameters, a Wi-Fi direct establishment request is sent to the first terminal, and handshake with the first terminal is performed to establish Wi-Fi direct, where the handshake is initiated after the first terminal receives the Wi-Fi direct establishment request, the first terminal is a Wi-Fi direct group owner (GO), and the target terminal is a Wi-Fi direct group client (GC).

The Wi-Fi direct module is controlled to receive, by using the established Wi-Fi direct, the file sent by the first terminal.

In this embodiment, the receiving terminal 900 may be further configured to perform the following steps: determining whether a Wi-Fi direct interface of the target terminal is occupied; and sending, to the first terminal, information used to indicate whether the Wi-Fi direct interface of the target terminal is occupied.

In this embodiment, the receiving terminal 900 may be further configured to perform the solution described in the method embodiment. Refer to the description in the method embodiment. Details are not described herein again.

The embodiments of the present invention further provide a computer storage medium. The computer storage medium may store a program. When the program is executed, at least a part or all of the steps of any file sending method in the foregoing method embodiments are performed.

The embodiments of the present invention further provide a computer storage medium. The computer storage medium may store a program. When the program is executed, at least a part or all of the steps of any file receiving method in the foregoing method embodiments are performed.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are examples of the embodiments, and the related actions and modules are not necessarily mandatory to the present invention.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like, and may be specifically a processor in a computer device) to perform all or a part of the steps of the foregoing methods described in the embodiments of the present invention. The foregoing storage medium includes: any medium that can store program code, such as a USB flash drive, a removable hard disk, a magnetic disk, an optical disc, a read-only memory (English: read-only memory, ROM for short), or a random access memory (English: random access memory, RAM for short).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. A file sending method, implemented by a first terminal, the method comprising:
    performing, by the first terminal, scanning on a BLUETOOTH low energy (BLE) broadcast channel to obtain a broadcast packet from at least one second terminal, wherein the broadcast packet comprises an account identifier associated with a file sending application of the at least one second terminal;
    determining, by the first terminal, at least one discoverable second terminal based on the broadcast packet;
    determining, by the first terminal, a target terminal configured to receive a file in the at least one discoverable second terminal;
    sending, by the first terminal, a coupling request to the target terminal;
    establishing, by the first terminal, a BLE coupling between the first terminal and the target terminal;
    sending, by the first terminal, WI-FI direct coupling parameters to the target terminal using a BLE data channel of the BLE coupling, wherein the WI-FI direct coupling parameters comprise WI-FI direct handshake information, an Internet Protocol (IP) address assigned by the first terminal to the target terminal, and a designated communication channel;
    receiving, by the first terminal, a WI-FI direct establishment request from the target terminal;
    performing, by the first terminal, a handshake with the target terminal to establish WI-FI direct after the WI-FI direct establishment request is received, wherein the WI-FI direct establishment request is received after the target terminal performs parameter configuration of the target terminal based on the WI-FI direct coupling parameters, wherein the first terminal is a WI-FI direct group owner (GO), and wherein the target terminal is a WI-FI direct group client (GC); and
    sending, by the first terminal, the file to the target terminal using the WI-FI direct established between the first terminal and the target terminal.

2. The file sending method of claim 1, wherein after establishing the BLE coupling between the first terminal and the target terminal, the file sending method further comprises:
    obtaining, by the first terminal, information indicating whether a WI-FI direct interface of the target terminal is occupied; and
    either popping up, on a display screen of the first terminal, a reminder message indicating that the file cannot be successfully sent temporarily, wherein the information indicates that the WI-FI direct interface of the target terminal is occupied; or
    sending, by the first terminal, the WI-FI direct coupling parameters to the target terminal using the BLE data channel of the BLE coupling, wherein the information indicates that the WI-FI direct interface of the target terminal is not occupied.

3. The file sending method of claim 1, wherein after establishing the WI-FI direct between the first terminal and the target terminal, the file sending method further comprises:
 obtaining, by the first terminal, an account avatar of the target terminal; and
 storing, by the first terminal, the account avatar and a correspondence between the target terminal and the account avatar.

4. The file sending method of claim 3, wherein before determining the target terminal, the file sending method further comprises displaying, by the first terminal, an account avatar of the at least one discoverable second terminal, and wherein the account avatar of the at least one discoverable second terminal is stored in the first terminal.

5. The file sending method of claim 1, wherein determining the at least one discoverable second terminal comprises:
 parsing, by the first terminal, the broadcast packet; and
 determining, by the first terminal, a second terminal sending the broadcast packet as the at least one discoverable second terminal, wherein a parsing result of the broadcast packet does not comprise information indicating that authentication needs to be performed on a terminal receiving the broadcast packet.

6. The file sending method of claim 1, wherein determining the at least one discoverable second terminal comprises:
 parsing, by the first terminal, the broadcast packet;
 sending, by the first terminal, an authentication request to a second terminal sending the broadcast packet, and obtaining an authentication result of performing authentication on the authentication request by the second terminal, wherein a parsing result of the broadcast packet comprises information indicating that the authentication needs to be performed on a terminal receiving the broadcast packet; and
 determining, by the first terminal, the second terminal sending the broadcast packet as the at least one discoverable second terminal, wherein the authentication result indicates that the authentication succeeds.

7. The file sending method of claim 1, wherein before performing the scanning on the BLE broadcast channel, the file sending method further comprises:
 obtaining, by the first terminal, a touch track on a display screen of the first terminal;
 performing, by the first terminal, triggering to generate a first instruction, wherein the touch track is a touch track sliding from a bottom of the display screen of the first terminal to a middle;
 displaying, by the first terminal, a shared application program preview screen comprising a designated application program on the display screen of the first terminal based on the first instruction;
 obtaining, by the first terminal, a touch instruction for the designated application program; and
 starting, by the first terminal, the designated application program.

8. The file sending method of claim 1, further comprising selecting the file sending application from a plurality of application programs before performing scanning on the BLE broadcast channel.

9. The file sending method of claim 1, wherein the account identifier comprises an account number or an account nickname.

10. The file sending method of claim 1, wherein determining the at least one discoverable second terminal comprises parsing, by the first terminal, the broadcast packet to acquire the account identifier associated with the file sending application of the at least one second terminal, wherein the file sending method further comprises displaying, by the first terminal, preview information of the at least one discoverable second terminal in a preview area of a candidate receiving terminal, wherein the preview information comprises the account identifier, and wherein determining the target terminal comprises:
 receiving, by the first terminal, an instruction of the account identifier in the preview information received from a user; and
 determining, by the first terminal, the target terminal, wherein the target terminal is a second terminal corresponding to the account identifier received from the user.

11. A file receiving method, implemented by a target terminal, the method comprising:
 setting, by the target terminal, a BLUETOOTH low energy (BLE) broadcast channel to be in a discoverable mode;
 sending, by the target terminal, a broadcast packet on the BLE broadcast channel, wherein the broadcast packet comprises an account identifier associated with a file sending application of the target terminal;
 receiving, by the target terminal, a coupling request to establish a BLE coupling from a first terminal;
 establishing the BLE coupling between the target terminal and the first terminal;
 obtaining, by the target terminal using a BLE data channel of the BLE coupling, WI-FI direct coupling parameters from the first terminal, wherein the WI-FI direct coupling parameters comprise WI-FI direct handshake information, an Internet Protocol (IP) address assigned by the first terminal to the target terminal, and a designated communication channel;
 sending, by the target terminal, a WI-FI direct establishment request to the first terminal, and performing a handshake with the first terminal to establish WI-FI direct after the target terminal performs parameter configuration of the target terminal based on the WI-FI direct coupling parameters, wherein the handshake is initiated after the first terminal receives the WI-FI direct establishment request, wherein the first terminal is a WI-FI direct group owner (GO), and wherein the target terminal is a WI-FI direct group client (GC); and
 receiving, by the target terminal using the WI-FI direct, a file from the first terminal.

12. The file receiving method of claim 11, wherein after establishing the BLE coupling between the target terminal and the first terminal, the file receiving method further comprises:
 determining, by the target terminal, whether a WI-FI direct interface of the target terminal is occupied; and
 sending, by the target terminal to the first terminal, information indicating whether the WI-FI direct interface of the target terminal is occupied.

13. The file receiving method of claim 11, wherein after establishing the WI-FI direct between the target terminal and the first terminal, the file receiving method further comprises sending, by the target terminal, an account avatar of the target terminal to the first terminal.

14. The file receiving method of claim 11, wherein the broadcast packet comprises information indicating that authentication needs to be performed on a terminal receiving the broadcast packet, and wherein before receiving the coupling request, the file receiving method further comprises:

receiving, by the target terminal, an authentication request from the first terminal;

performing, by the target terminal, the authentication on the authentication request; and sending, by the target terminal, an authentication result to the first terminal.

15. A file sending terminal, comprising:
a communications bus;
a wireless coupling circuit coupled to the communications bus and comprising:
a BLUETOOTH low energy (BLE) circuit configured to enable and perform a BLE function; and
a WI-FI direct circuit configured to enable and perform a WI-FI direct function;
an input apparatus coupled to the communications bus and configured to obtain an operation instruction of a user;
a memory coupled to the communications bus and configured to store at least one program comprising instructions; and
a processor coupled to the communications bus, wherein the at least one program causes the processor to be configured to:
obtain, using the input apparatus, instructions of enabling the BLE function and the WI-FI direct function from the user;
enable the BLE function and the WI-FI direct function;
control the BLE circuit to perform scanning on a BLE broadcast channel to obtain a broadcast packet from at least one second terminal, wherein the broadcast packet comprises an account identifier associated with a file sending application of the at least one second terminal;
determine at least one discoverable second terminal based on the broadcast packet;
obtain a target terminal configured to receive a file and selected by the user from the at least one discoverable second terminal using the input apparatus;
control the BLE circuit to send a coupling request to the target terminal;
establish a BLE coupling between the file sending terminal and the target terminal;
control the BLE circuit to send WI-FI direct coupling parameters to the target terminal using a BLE data channel of the BLE coupling, wherein the WI-FI direct coupling parameters comprise WI-FI direct handshake information, an Internet Protocol (IP) address assigned by the file sending terminal to the target terminal, and a designated communication channel;
receive a WI-FI direct establishment request from the target terminal;
perform handshake with the target terminal to establish WI-FI direct after receiving the WI-FI direct establishment request, wherein the WI-FI direct establishment request is received after the target terminal performs parameter configuration of the target terminal based on the WI-FI direct coupling parameters, wherein the file sending terminal is a WI-FI direct group owner (GO), and wherein the target terminal is a WI-FI direct group client (GC); and control the WI-FI direct circuit to send the file to the target terminal using the WI-FI direct established between the file sending terminal and the target terminal.

16. The file sending terminal of claim 15, wherein after establishing the BLE coupling between the file sending terminal and the target terminal, the at least one program further causes the processor to be configured to:
obtain information indicating whether a WI-FI direct interface of the target terminal is occupied; and
either:
pop up, on a display screen of the file sending terminal, a reminder message indicating that the file cannot be successfully sent temporarily, wherein the information indicates that the WI-FI direct interface of the target terminal is occupied; or
send the WI-FI direct coupling parameters to the target terminal using the BLE data channel of the BLE coupling, wherein the information indicates that the WI-FI direct interface of the target terminal is not occupied.

17. A terminal device, comprising:
a display screen configured to:
display an application conversation interface;
display an input method interface; and
display conversation information on the application conversation interface;
a memory coupled to the display screen and configured to store an instruction; and
a processor coupled to the display screen and the memory, wherein the instruction causes the processor to be configured to:
perform scanning on a BLUETOOTH low energy (BLE) broadcast channel to obtain a broadcast packet from at least one terminal, wherein the broadcast packet comprises an account identifier associated with a file sending application of the at least one terminal;
determine at least one discoverable terminal based on the broadcast packet;
determine a target terminal configured to receive a file in the at least one discoverable terminal;
send a coupling request to the target terminal;
establish a BLE coupling between the terminal device and the target terminal;
send WI-FI direct coupling parameters to the target terminal using a BLE data channel of the BLE coupling, wherein the WI-FI direct coupling parameters comprise WI-FI direct handshake information, an Internet Protocol (IP) address assigned by the terminal device to the target terminal, and a designated communication channel;
receive a WI-FI direct establishment request from the target terminal;
perform handshake with the target terminal to establish WI-FI direct after the WI-FI direct establishment request is received, wherein the WI-FI direct establishment request is received after the target terminal performs parameter configuration of the target terminal based on the WI-FI direct coupling parameters, wherein the terminal device is a WI-FI direct group owner (GO), and wherein the target terminal is a WI-FI direct group client (GC); and
send the file to the target terminal using the WI-FI direct established between the terminal device and the target terminal.

18. A terminal device, comprising:
a display screen configured to:
   display an application conversation interface;
   display an input method interface; and
   display conversation information on the application conversation interface;
a memory coupled to the display screen and configured to store an instruction; and
a processor coupled to the display screen and the memory, wherein the instruction causes the processor to be configured to:
   set BLUETOOTH low energy (BLE) to be in a discoverable mode;
   send a broadcast packet on a BLE broadcast channel, wherein the broadcast packet comprises an account identifier associated with a file sending application of the terminal device;
   receive a coupling request to establish a BLE coupling from a first terminal;
   establish the BLE coupling between the terminal device and the first terminal;
   obtain, using a BLE data channel of the BLE coupling, WI-FI direct coupling parameters from the first terminal, wherein the WI-FI direct coupling parameters comprise WI-FI direct handshake information, an Internet Protocol (IP) address, and a designated communication channel;
   send a WI-FI direct establishment request to the first terminal, and perform handshake with the first terminal to establish WI-FI direct after the terminal device performs parameter configuration of the terminal device based on the WI-FI direct coupling parameters, wherein the handshake is initiated after the first terminal receives the WI-FI direct establishment request, wherein the first terminal is a WI-FI direct group owner (GO), and wherein the terminal device is a WI-FI direct group client (GC); and
   receive, using the WI-FI direct, a file from the first terminal.

19. A non-transitory computer readable medium storing computer usable program code, wherein a computer device executes the computer usable program code to:
   perform scanning on a BLUETOOTH low energy (BLE) broadcast channel to obtain a broadcast packet from at least one terminal, wherein the broadcast packet comprises an account identifier associated with a file sending application of the at least one terminal;
   determine at least one discoverable terminal based on the broadcast packet;
   determine a target terminal configured to receive a file in the at least one discoverable terminal;
   send a coupling request to the target terminal;
   establish a BLE coupling between the computer device and the target terminal;
   send WI-FI direct coupling parameters to the target terminal using a BLE data channel of the BLE coupling, wherein the WI-FI direct coupling parameters comprise WI-FI direct handshake information, an Internet Protocol (IP) address assigned to the target terminal, and a designated communication channel;
   receive a WI-FI direct establishment request from the target terminal;
   perform handshake with the target terminal to establish WI-FI direct after the WI-FI direct establishment request is received, wherein the WI-FI direct establishment request is received after the target terminal performs parameter configuration of the target terminal based on the WI-FI direct coupling parameters, wherein the computer device is a WI-FI direct group owner (GO), and wherein the target terminal is a WI-FI direct group client (GC); and
   send the file to the target terminal using the WI-FI direct established between the computer device and the target terminal.

20. A non-transitory computer readable medium storing computer usable program code, wherein a computer device executes the computer usable program code to:
   set BLUETOOTH low energy (BLE) to be in a discoverable mode;
   send a broadcast packet on a BLE broadcast channel, wherein the broadcast packet comprises an account identifier associated with a file sending application;
   receive a coupling request to establish a BLE coupling from a first terminal;
   establish the BLE coupling between the computer device and the first terminal;
   obtain, using a BLE data channel of the BLE coupling, WI-FI direct coupling parameters from the first terminal, wherein the WI-FI direct coupling parameters comprise WI-FI direct handshake information, an Internet Protocol (IP) address assigned by the first terminal to the computer device, and a designated communication channel;
   send a WI-FI direct establishment request to the first terminal, and perform handshake with the first terminal to establish WI-FI direct after the computer device performs parameter configuration of the computer device based on the WI-FI direct coupling parameters, wherein a handshake is initiated after the first terminal receives the WI-FI direct establishment request, wherein the first terminal is a WI-FI direct group owner (GO), and wherein the computer device is a WI-FI direct group client (GC); and
   receive, using the WI-FI direct, a file from the first terminal.

* * * * *